(12) United States Patent
Allio

(10) Patent No.: US 7,777,757 B2
(45) Date of Patent: Aug. 17, 2010

(54) METHOD FOR DISPLAYING AN AUTOSTEREOSCOPIC IMAGE HAVING N VIEWPOINTS

(75) Inventor: Pierre Allio, Paris (FR)

(73) Assignee: Alioscopy, Paris (FR)

( * ) Notice: Subject to any disclaimer, the term of this patent is extended or adjusted under 35 U.S.C. 154(b) by 665 days.

(21) Appl. No.: 11/572,875

(22) PCT Filed: Jul. 29, 2005

(86) PCT No.: PCT/FR2005/001994

§ 371 (c)(1),
(2), (4) Date: Aug. 21, 2007

(87) PCT Pub. No.: WO2006/024764

PCT Pub. Date: Mar. 9, 2006

(65) Prior Publication Data

US 2008/0204455 A1 Aug. 28, 2008

(30) Foreign Application Priority Data

Jul. 30, 2004 (FR) .................................. 04 08458

(51) Int. Cl.
*G09G 5/00* (2006.01)
*G09G 5/02* (2006.01)
*G09G 3/36* (2006.01)

(52) U.S. Cl. .................. 345/589; 345/581; 345/690; 345/88; 345/600; 348/42; 348/557; 348/E13.29; 348/E13.43; 358/518; 382/162; 382/167

(58) Field of Classification Search .............. 345/581, 345/589, 593, 597, 600, 606, 612, 643, 644, 345/549, 22, 690, 88; 348/41–42, 51, 527, 348/538, 557, 578, 630, 659, 54, 59–60, 348/E13.29; 382/162, 167; 358/518–519, 358/525

See application file for complete search history.

(56) References Cited

U.S. PATENT DOCUMENTS

| 6,972,744 B1 * | 12/2005 | Allio ............................. 345/88 |
| 2008/0204546 A1 * | 8/2008 | Dawe et al. .................... 348/51 |
| 2009/0051759 A1 * | 2/2009 | Adkins et al. ................. 348/53 |

FOREIGN PATENT DOCUMENTS

| EP | 0 791 847 A | 8/1997 |
| WO | WO 00/10332 A | 2/2000 |
| WO | WO 2004/043079 A | 5/2004 |

OTHER PUBLICATIONS

Berkel et al., "Design and Applications of Multiview 3D-LCD", *Proceedings of the 16th International Display Research Conference*, Oct. 1-3, 1996, vol. CONF. 16, pp. 109-112.

* cited by examiner

*Primary Examiner*—Wesner Sajous
(74) *Attorney, Agent, or Firm*—Alston & Bird LLP

(57) ABSTRACT

The invention relates to a method for displaying an autostereoscopic image having N viewpoints on at least a portion of a screen containing display pixels arranged in lines and columns, each display pixel containing a first, a second and a third color point aligned on the same line and each being of a different color (R.V.B.). The first display pixel of one line is constituted of color points of row 1 to 3, the second display pixel of one line is constituted of color points of row 4 to 6, the display pixel of row q of a line is constituted of color points of row (3q 2) to 3q. According to the inventive method, N is greater than 1 and the pixels of an autostereoscopic image to be displayed are displayed in such a manner that the 3 color points of each display pixel display 3 homologous color component color points of pixels of the autostereoscopic image coming from at least two pixels of the same row of at least two different viewpoints. The invention is characterized in that, for at least one group of two successive image lines comprising a first, a second and a third line, said spatial distribution of the 3 color points is offset by a step corresponding to a color point when passing from one line of the group to an adjacent line.

16 Claims, 14 Drawing Sheets

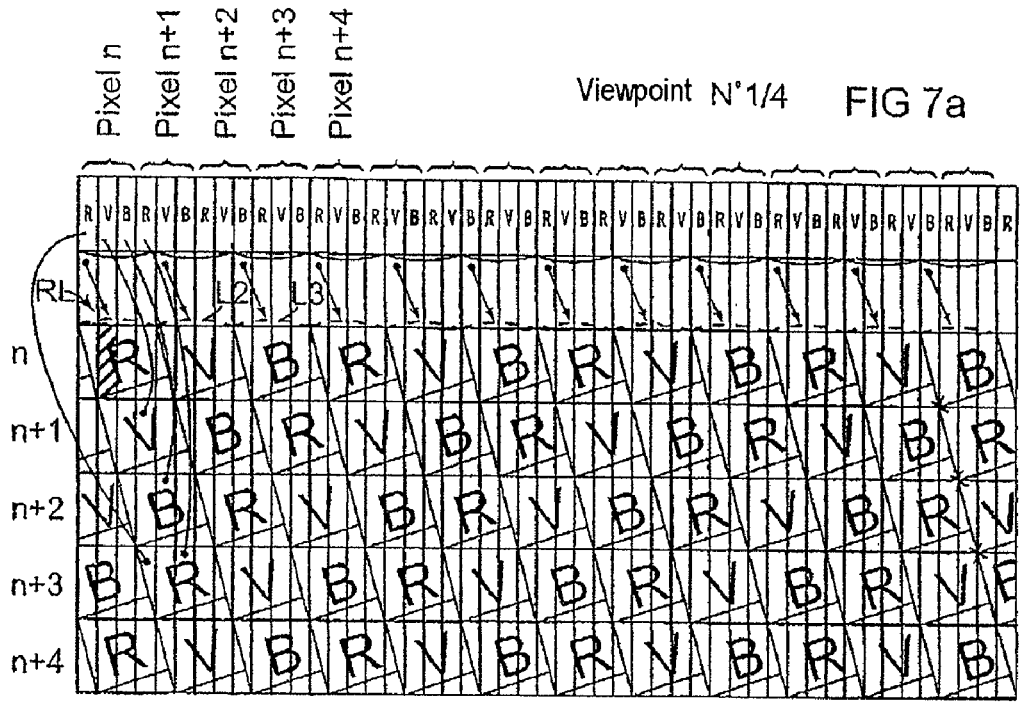
Viewpoint N°1/4  FIG 7a
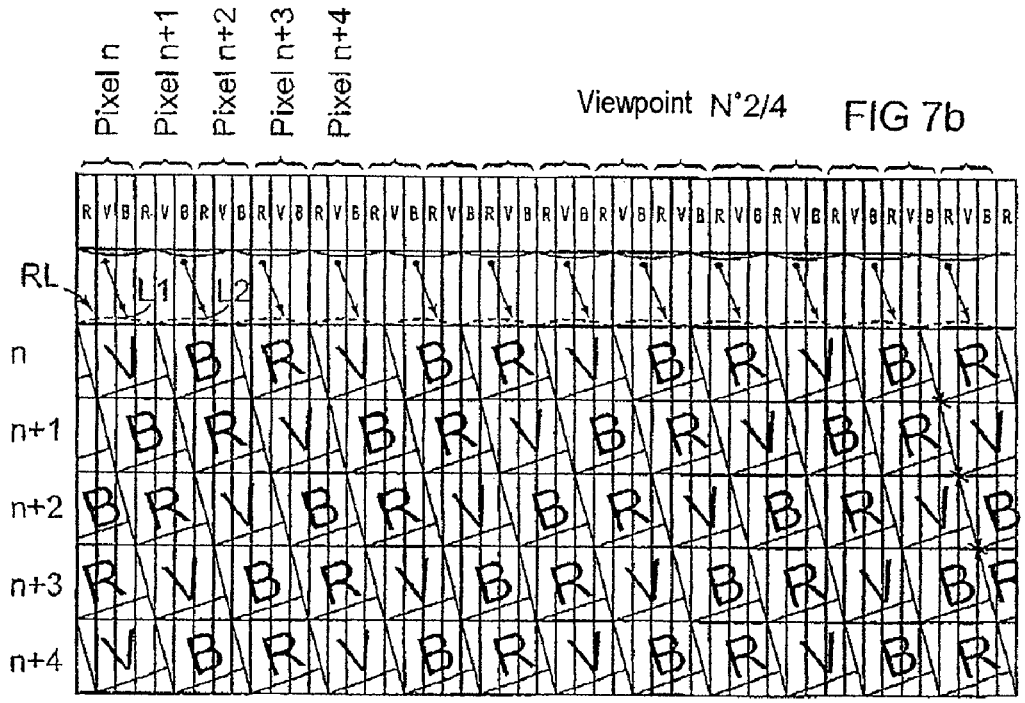
Viewpoint N°2/4  FIG 7b

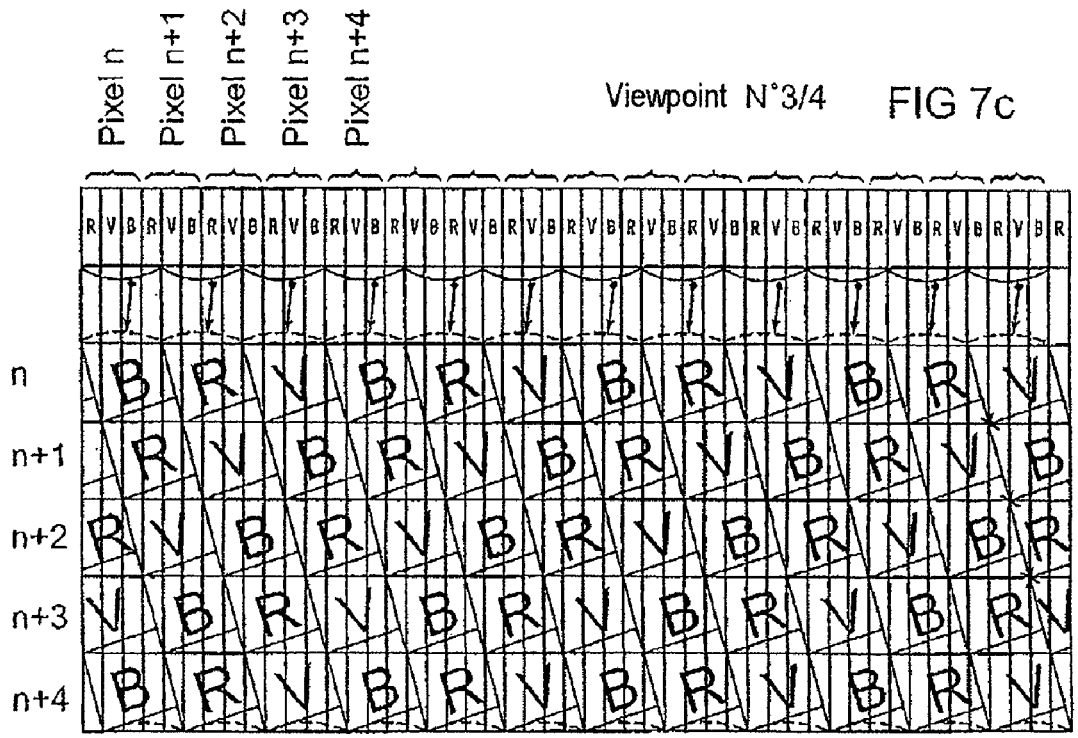
FIG 7c Viewpoint N°3/4
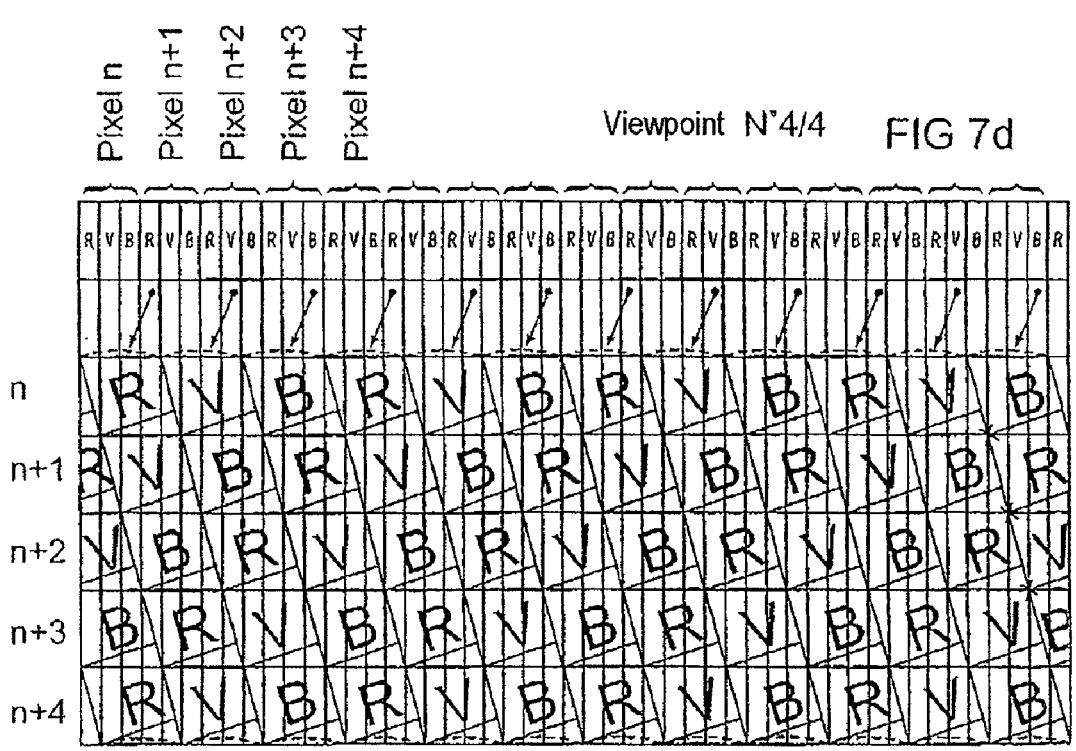
FIG 7d Viewpoint N°4/4

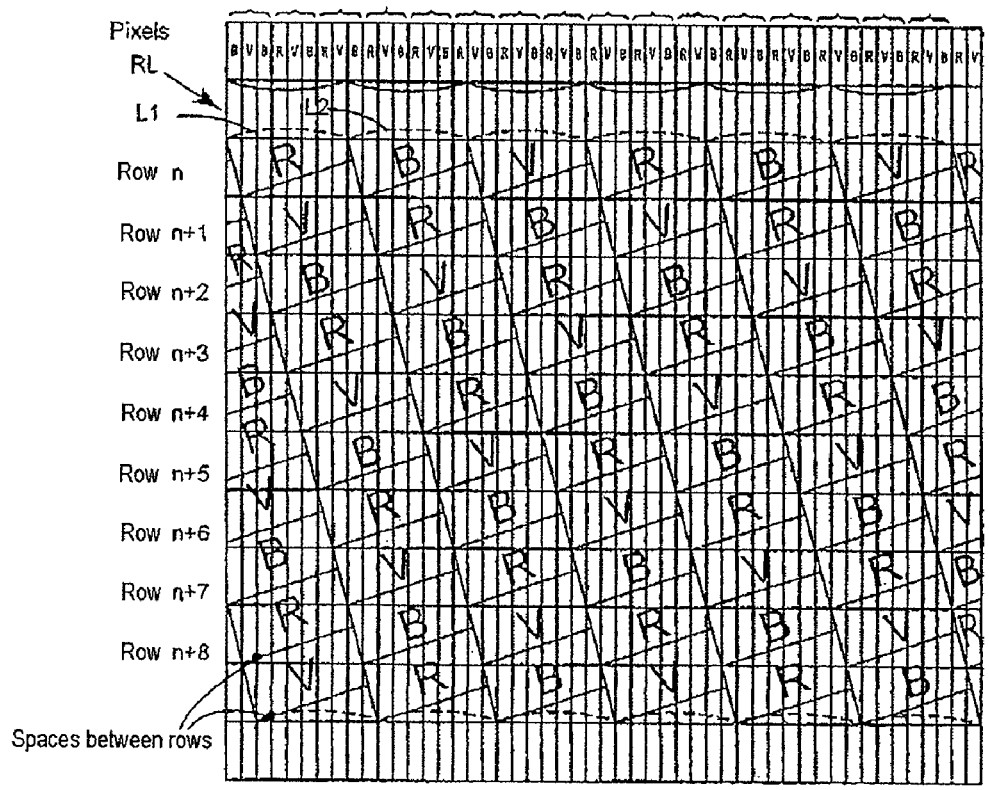
FIG 8a  Viewpoint n°1/8
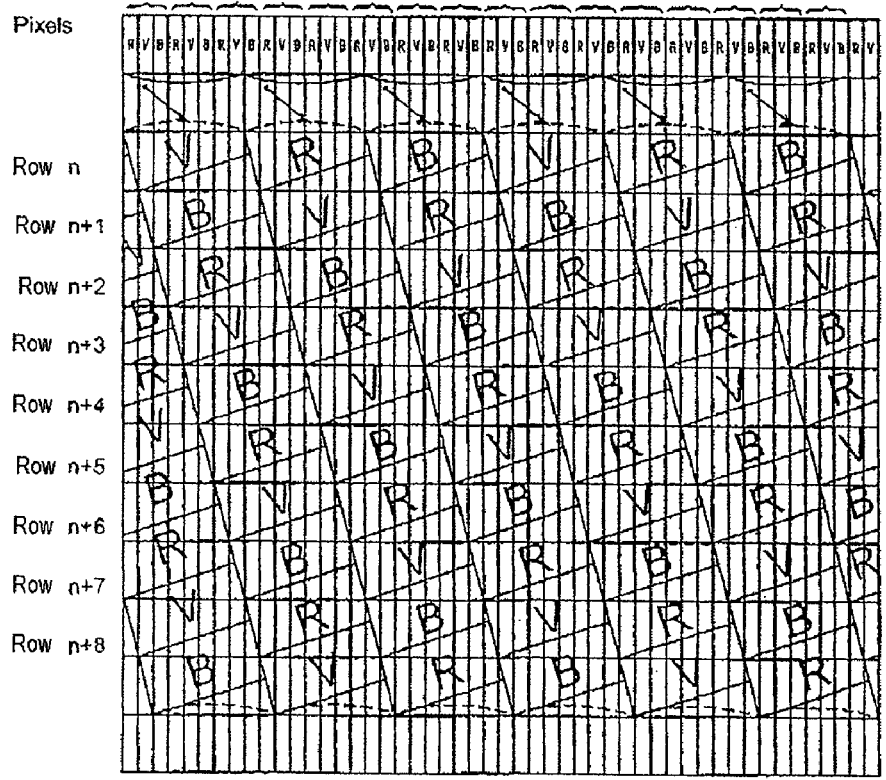
FIG 8b  Viewpoint n°2/8

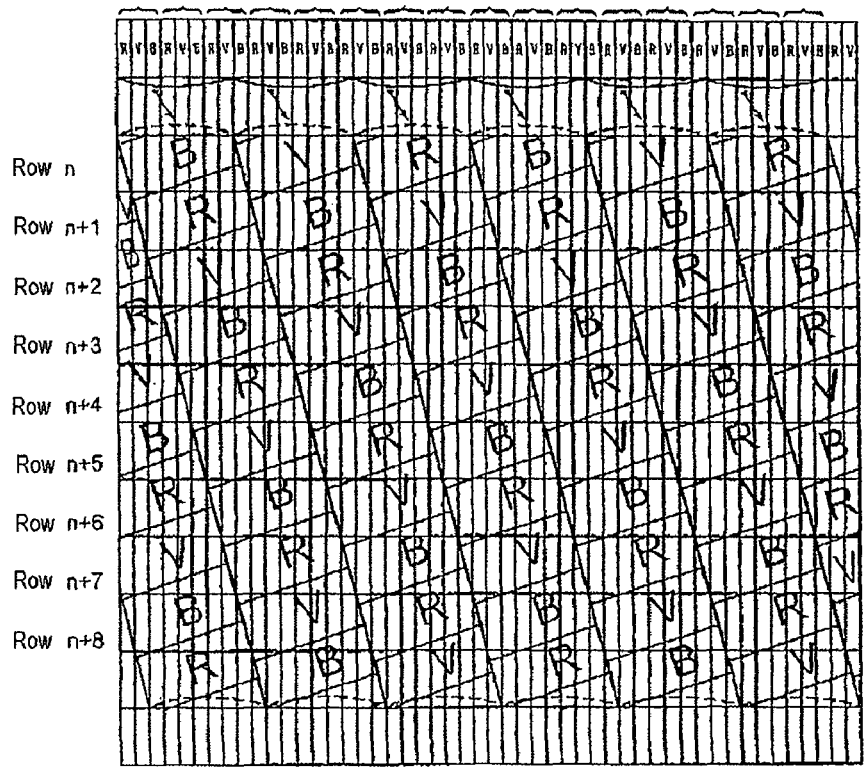
FIG 8c  Viewpoint n°3/8
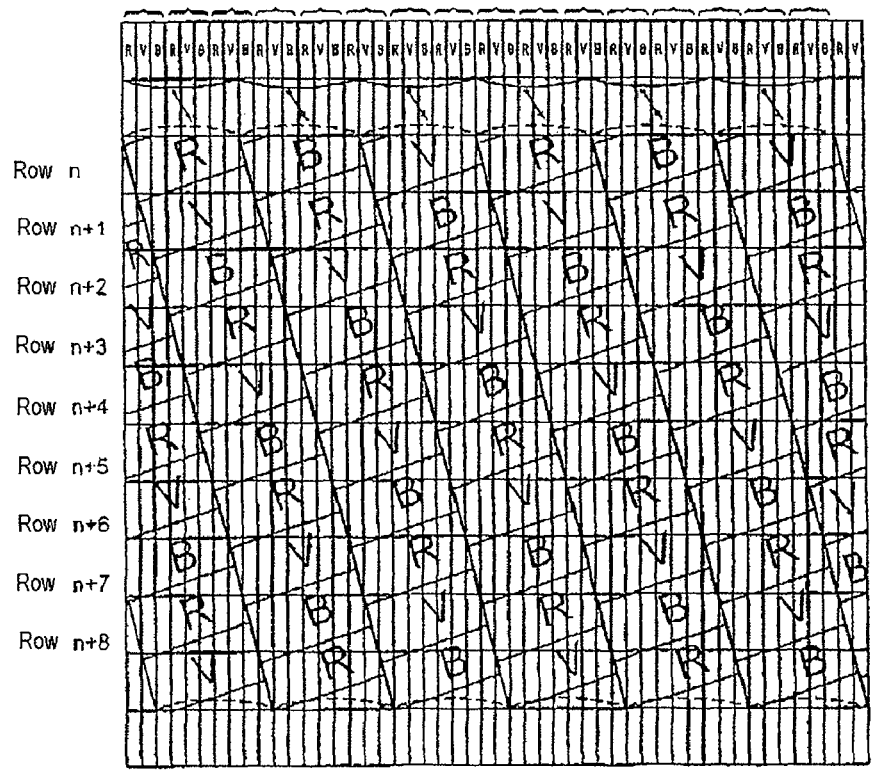
FIG 8d  Viewpoint n°4/8

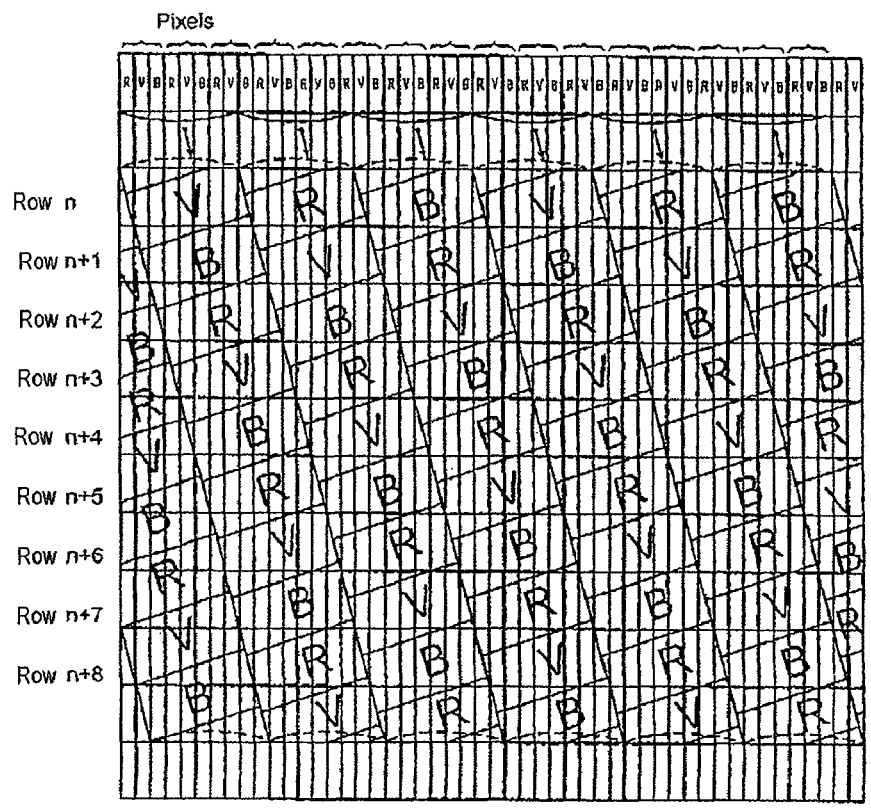
FIG 8e  Viewpoint n°5/8
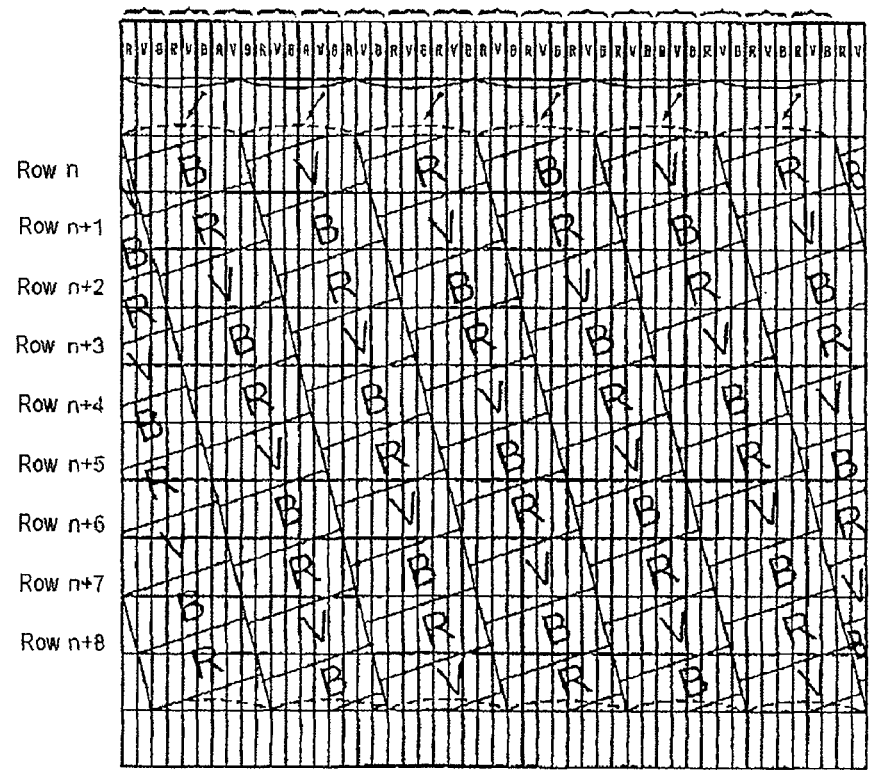
FIG 8f  Viewpoint n°6/8

FIG 8g    Viewpoint n°7/8

FIG 8h    Viewpoint n°8/8

| R 11R | V 21V | B 11B | R 21R | V 11V | B 21B | R 12R | V 22V | B 12B | R 22R | V 12V | B 22B | R 13R | V 23V | B 13B |
|---|---|---|---|---|---|---|---|---|---|---|---|---|---|---|
| V 11V | B 21B | R 11R | V 21V | B 11B | R 21R | V 12V | B 22B | R 12R | V 22V | B 12B | R 22R | V 13V | B 23B | R 13R |
| B 11B | R 21R | V 11V | B 21B | R 11R | V 21V | B 12B | R 22R | V 12V | B 22B | R 12R | V 22V | B 13B | R 23R | V 13V |
| R 11R | V 21V | B 11B | R 21R | V 11V | B 21B | R 12R | V 22V | B 12B | R 22R | V 12V | B 22B | R 13R | V 23V | B 13B |

FIG 9  N=2

| R 11R | V 21V | B 11B | R 21R | V 11V | B 21B | R 12R | V 22V | B 12B | R 22R | V 12V | B 22B | R 13R | V 23V | B 13B |
|---|---|---|---|---|---|---|---|---|---|---|---|---|---|---|
| R 21R | V 11V | B 21B | R 11R | V 21V | B 11B | R 21R | V 12V | B 22B | R 12R | V 22V | B 12B | R 22R | V 13V | B 23B |
| R 11R | V 21V | B 11B | R 21R | V 11V | B 21B | R 12R | V 22V | B 12B | R 22R | V 12V | B 22B | R 13R | V 23V | B 13B |
| R 21R | V 11V | B 21B | R 11R | V 21V | B 11B | R 21R | V 12V | B 22B | R 12R | V 22V | B 12B | R 22R | V 13V | B 23B |

METHOD FOR DISPLAYING AN AUTOSTEREOSCOPIC IMAGE HAVING N VIEWPOINTS

CROSS-REFERENCE TO RELATED APPLICATIONS

This is a national phase application under 35 U.S.C. 371 of International Application No. PCT/FR2005/001994 filed Jul. 29, 2005, which claims priority from French Application No. 0408458 filed Jul. 30, 2004.

FIELD AND BACKGROUND OF THE INVENTION

The present invention relates to a method for displaying a stereoscopic image having N viewpoints.

A method for displaying an autostereoscopic image on a screen is known from the patent EP 697 163 in which the color dots (typically red, green and blue) of the pixels of the autostereoscopic image are permutated in such a manner that the p color dots of each pixel of each viewpoint are seen in p successive elements of a viewing array, for example a lens array.

In the patent application PCT WO 00/10332 published on the Feb. 24, 2000, each pixel of the autostereoscopic image to be displayed is composed of p color dots coming from p different pixels of an autostereoscopic image of higher definition, which allows the loss of definition due to the presence of N viewpoints to be at least partially compensated.

In the commercially available screens, there exist dark spaces between the pixels which produce black bars that become visible during the autostereoscopic viewing by means of a lens array or of a parallax array.

Furthermore, the cumulative effect of the distribution of the colors of the color dots vertically visible within the columns of the image tend to produce uniform areas of color in the form of vertical bands of color alternately red, green or blue, which may be visible as such in certain regions of the image.

SUMMARY OF THE INVENTION

The basic idea of the invention is that, when successive rows are displayed on the screen, each group of p color dots forming a given pixel of the image begins with a different color over p successive rows of the displayed image. The invention may be applied to one or the other of the display techniques described in the two patent applications identified hereinabove.

The invention thus relates to a method for displaying an autostereoscopic image having N viewpoints each of which comprises p pixels, over at least a part of a screen comprising display pixels arranged in rows and columns, each display pixel comprising first, second, and third color dots aligned along the same row and each of which is of different color (R, G, B), the first display pixel of a row being formed by the color dots of rank 1 to 3, the second display pixel of a row being formed by the color dots of rank 4 to 6, ... the display pixel of rank q of a row being formed by the color dots of rank (3q−2) to 3q, in which method N is an integer greater than 1 and in which the pixels of an autostereoscopic image to be displayed are displayed in such a manner that the 3 color dots of each display pixel display 3 color dots of homologous color component of 3 different pixels of the autostereoscopic image coming from at least two pixels of same rank from at least two different viewpoints, characterized in that, for at least one group of three successive rows of the image comprising a first, a second and a third row, said spatial distribution of the 3 color dots is displaced by at least one step corresponding to one color dot when going from one row of the group to an adjacent row.

According to a first and a second variant, N is not a multiple of 3 and the pixels of the autostereoscopic image to be displayed are displayed by spatially distributing the three color dots of each pixel of the autostereoscopic image with a pitch equal to N between the three color dots of homologous color component of at least two different display pixels. Thus, the three color dots of each pixel are seen in three successive lenticules of a lenticular (or parallax) array.

According to a first embodiment of the first variant, the method is characterized in that N=2 and in that:

the first row of a group of three rows of the screen successively displays the first color dot (11R) of the first pixel of the first row of the first viewpoint of the autostereoscopic image, the second color dot (21G) of the first pixel of the first row of the second viewpoint of the autostereoscopic image, the third color dot (11B) of the first pixel of the first row of the first viewpoint of the autostereoscopic image, and so on up to the third color dot (2pB) of the $p^{th}$ pixel which is the last pixel of the first row of the second viewpoint of the autostereoscopic image;

the second row of a group of three rows of the screen successively displays the second color dot of the first pixel (11G) of the second row of the first viewpoint of the autostereoscopic image, the third color dot of the first pixel (21B) of the second row of the second viewpoint of the autostereoscopic image, the first color dot (11R) of the first pixel of the second row of the first viewpoint of the autostereoscopic image, and so on up to the first color dot (2pR) of the $p^{th}$ pixel of the second row of the second viewpoint of the autostereoscopic image;

the third row of a group of three rows of the screen successively displays the third color dot (11B) of the first pixel of the third row of the first viewpoint of the autostereoscopic image, the first color dot (21R) of the first pixel of the third row of the second viewpoint of the autostereoscopic image, the second color dot (11G) of the first pixel of the third row of the first viewpoint of the autostereoscopic image, and so on up to the second color dot (2pG) of the $p^{th}$ pixel of the third row of the second viewpoint of the autostereoscopic image.

According to a second embodiment of this first variant, the method is characterized in that N>3 and in that:

the first row of a said group of three rows of the screen successively displays the first color dot (11R) of the first pixel of the first row of the first viewpoint of the autostereoscopic image, the second color dot (21G) of the first pixel of the first row of the second viewpoint of the autostereoscopic image, the third color dot (31B) of the first pixel of the first row of the third viewpoint of the autostereoscopic image, and so on up to the $R_0(N/3)^{th}$ color dot of the first pixel of the $N^{th}$ viewpoint, this sequence subsequently being repeated for the following pixels of the autostereoscopic image, namely for the first color dot of the second pixel of the first viewpoint of the autostereoscopic image, for the second color dot of the second pixel of the second viewpoint of the autostereoscopic image, ... for the $R_0(N/3)^{th}$ color dot of the first row of the second pixel of the $N^{th}$ viewpoint, up to the last color dot which is the $R_0(N/3)^{th}$ color dot of the first row of the $q^{th}$ pixel of the $N^{th}$ viewpoint;

the second row of a said group of three rows successively displays the second color dot (11G) of the first pixel of the second row of the first viewpoint of the autostereoscopic image, the third color dot (21B) of the first pixel of the second row of the second viewpoint of the autostereoscopic image, the first color dot (31R) of the first pixel of the second row of the third viewpoint, and so on up to the $[R_0(N/3)+1]^{th}$ color dot of the first pixel of the second row of the $N^{th}$ viewpoint, this sequence subsequently being repeated for the following pixels of each of the viewpoints of the autostereoscopic image, namely with the second color dot of the second pixel of the first viewpoint of the autostereoscopic image, for the third color dot of the second pixel of the second row of the second viewpoint of the autostereoscopic image, for the first color dot of the second pixel of the third viewpoint of the autostereoscopic image, ... for the $[R_0(N/3)+1]^{th}$ color dot of the second pixel of the second row of the $N^{th}$ viewpoint, up to the last color dot which is the $[R_0(N/3)+1]^{th}$ color dot of the $q^{th}$ pixel of the second row of the $N^{th}$ viewpoint;

and the third row of a said group of three rows successively displays the third color dot (11B) of the first pixel of the third row of the first viewpoint, the first color dot (21R) of the first pixel of the third row of the second viewpoint, the second color dot (31G) of the first pixel of the third row of the third viewpoint and so on up to the third color dot for $(R_0(N/3)=1)$ or up to the first color dot for $(R_0(N/3)=2)$ of the first pixel of the third row of the $N^{th}$ viewpoint, this sequence subsequently being repeated for the following pixels of the third row of each of the viewpoints, namely with the third color dot of the second pixel of the third row of the first viewpoint, the first color dot of the second pixel of the third row of the second viewpoint, the second color dot of the second pixel of the third row of the third viewpoint, ... the third color dot for $(R_0(N/3)=1)$ or to the first color dot for $(R_0(N/3)=2)$ of the second pixel of the third row of the $N^{th}$ viewpoint, up to the last color dot which is the third color dot for $(R_0(N/3)=1)$ or the first color dot for $R_0(N/3)=2$ of the $q^{th}$ pixel of the third row of the $N^{th}$ viewpoint, the function $R_0(N/3)$ denoting the remainder (1 or 2) of the division of N by 3.

This first variant is adapted in the case of a screen that has pixels ordered differently along the rows.

The process may then be characterized in that the screen has at least one group of three rows whose pixels have three color dots disposed over three successive columns of color dots, the color dots being permutated from one row to another, the first row comprising display pixels each of which is successively composed of a first color dot, of a second color dot and of a third color dot, the second row comprising display pixels each of which is successively composed of a second color dot, of a third color dot and of a first color dot, and the third row comprising display pixels each of which is successively composed of a third color dot, of a first color dot and of a second color dot.

In this case, viewing may be achieved by means of at least one angular selector array having one axis parallel to the columns, namely a lenticular array placed in front of the screen or a parallax array placed in front of the screen. In the case of a back-lit screen (for example a liquid crystal screen), the parallax array may also be situated between the screen and an illuminating device.

According to the second variant, the screen has pixels ordered identically over the rows. In this case, the main axis of the angular selector array placed in front of the screen or between the screen and an illuminating device is inclined in such a manner as to be parallel to the diagonals of the color dots of the screen, resulting in a displacement from one row to another which is equal to the pitch of the color dots. The pitch PR of the angular selector array allows N color dots to be covered.

According to a first embodiment of this second variant, the method is characterized in that N=2 and, for a group of 2 rows comprising first and second rows, in that:

the first row of a group of two rows of the screen successively displays the first color dot (11R) of the first pixel of the first row of the first viewpoint of the autostereoscopic image, the second color dot (21G) of the first pixel of the first row of the second viewpoint of the autostereoscopic image, the third color dot (11B) of the first pixel of the first row of the first viewpoint of the autostereoscopic image, and so on up to the third color dot $(2pB)$ of the $p^{th}$ pixel of the first row of the second viewpoint of the autostereoscopic image;

the second row of a group of two rows of the screen successively displays the first color dot of the first pixel (21R) of the second row of the second viewpoint of the autostereoscopic image, the second color dot of the first pixel (11G) of the second row of the first viewpoint of the autostereoscopic image, the third color dot (21B) of the first pixel of the second row of the second viewpoint of the autostereoscopic image, and so on up to the third color dot $(1pB)$ of the $p^{th}$ pixel of the second row of the first viewpoint of the autostereoscopic image.

According to a second embodiment of this second variant, the method is characterized in that N>3 and, for a group of N rows comprising first, second, and third rows, ... and an $N^{th}$ row, in that:

for the first row of said group:

a first color dot (11R, 12R, 13R, ... ) of the pixels of the first row of a said first viewpoint is displayed on the color dots of rank 1 modulo 3N of the display pixels of the first row, a second color dot (11G, 12G, 13G ... ) of the pixels of the first row of a said first viewpoint is displayed on the color dots of rank 1+N modulo 3N of the display pixels of the first row, and a third color dot (11B, 12B, 13B ... ) of the pixels of the first row of said first viewpoint is displayed on the color dots of rank 1+2N modulo 3N of the display pixels of the first row;

a second color dot (21G, 22G, 23G ... ) of the pixels of the first row of a said second viewpoint is displayed on the color dots of rank 2 modulo 3N of the display pixels of the first row, a third color dot (21B, 22B, 23B ... ) of the pixels of the first row of said second viewpoint is displayed on the color dots of rank 2+N modulo 3N of the display pixels of the first row, and a first color dot (21R, 22R, 23R ... ) of the pixels of the first row of said second viewpoint is displayed on the color dots of rank 2+2N modulo 3N of the display pixels of the first row;

a third color dot of the pixels (31B, 32B, 33B ... ) of the first row of a said third viewpoint is displayed on the color dots of rank 3 modulo 3N of the display pixels of the first row, a first color dot (31R, 32R, 33R ... ) of the pixels of the first row of said third viewpoint is displayed on the color dots of rank 3+N modulo 3N of the display pixels of the first row, and a second color dot (31G, 32G, 33G ... ) of the pixels of the first row of said third viewpoint is displayed on the color dots of rank 3+2N modulo 3N of the display pixels of the first row, etc. ... ;

and an $R_0(N/3)^{th}$ color dot of the pixels of the first row of the $N^{th}$ viewpoint is displayed on the color dots of rank N modulo 3N of the display pixels of the first row, an $[R_0(N/3)+1]^{th}$ color dot of the pixels of the first row of the $N^{th}$ viewpoint is displayed on the color dots of rank 2N modulo 3N of the display pixels of the first row, and the third color dot for $R_0(N/3)=1$ or the first color dot for $R_0(N/3)=2$ of the pixels of the first row of the $N^{th}$ viewpoint is displayed on the color dot of rank 3N modulo 3N of the display pixels of the first row;

for the second row of said group:

a second color dot of the pixels (11G, 12G, 13G ... ) of the second row of a said first viewpoint is displayed on the color dots of rank 2 modulo 3N of the display pixels of the second row, a third color dot (11B, 12B, 13B ... ) of the pixels of the second row of said first viewpoint is displayed on the color dots of rank 2+N modulo 3N of the display pixels of the second row, and a first color dot (11R, 12R, 13R ... ) of the pixels of the second row of said first viewpoint is displayed on the color dots of rank 2+2N modulo 3N of the display pixels of the second row;

a third color dot (21B, 22B, 23B ... ) of the pixels of the second row of a said second viewpoint is displayed on the color dots of rank 3 modulo 3N of the display pixels of the second row, a first color dot (21R, 22R, 23R ... ) of the pixels of the second row of said second viewpoint is displayed on the color dots of rank 3+N modulo 3N of the display pixels of the second row, and a second color dot (21G, 22G, 23G ... ) of the pixels of the second row of said second viewpoint is displayed on the color dots of rank 3+2N modulo 3N of the display pixels of the second row;

a first color dot (31R, 32R, 33R, ... ) of the pixels of the second row of a said third viewpoint is displayed on the color dots of rank 4 modulo 3N of the display pixels of the second row, a second color dot (31G, 32G, 33G ... ) of the pixels of the second row of said third viewpoint is displayed on the color dots of rank 4+N modulo 3N of the display pixels of the second row, and a third color dot (31B, 32B, 33B ... ) of the pixels of the second row of said third viewpoint is displayed on the color dots of rank 4+2N modulo 3N of the display pixels of the second row, etc. ... ;

and a first color dot of the pixels of the second row of the $N^{th}$ viewpoint is displayed on the color dots 1 modulo 3N of the display pixels of the second row, the second (for $R_0(N/3)=1$) or the third (for $R_0(N/3)=2$) color dot for the pixels of the second row of the $N^{th}$ viewpoint is displayed on the color dots of rank N+1 modulo 3N of the display pixels of the second row, and the third (for $R_0(N/3)=1$) or the second (for $R_0(N/3)=2$) color dot of the pixels of the second row of the $N^{th}$ viewpoint is displayed on the color dots of rank 2N+1 modulo 2N of the display pixels of the second row;

for the third row of said group:

a third color dot (11B, 12B, 13B ... ) of the pixels of the third row of a said first viewpoint is displayed on the color dots of rank 3 modulo 3N of the display pixels of the third row, a first color dot (11R, 12R, 13R ... ) of the pixels of the third row of a said first viewpoint is displayed on the color dots of rank 3+N modulo 3N of the display pixels of the third row, and a second color dot (11G, 12G, 13G ... ) of the pixels of the third row of said first viewpoint is displayed on the color dots of rank 1+2N modulo 3N of the display pixels of the third row;

a first color dot (21R, 22R, 23R ... ) of the pixels of the third row of a said second viewpoint is displayed on the color dots of rank 4 modulo 3N of the display pixels of the third row, a second color dot (21G, 22G, 23G ... ) of the pixels of the third row of said second viewpoint is displayed on the color dots of rank 4+N modulo 3N of the display pixels of the third row, and a first color dot (21R, 22R, 23R ... ) of the pixels of the third row of said second viewpoint is displayed on the color dots of rank 4+2N modulo 3N of the display pixels of the third row;

a second color dot (31G, 32G, 33G ... ) of the pixels of the third row of a said third viewpoint is displayed on the color dots of rank 5 modulo 3N of the display pixels of the third row, a third color dot (31B, 32B, 33B ... ) of the pixels of the third row of said third viewpoint is displayed on the color dots of rank 5+N modulo 3N of the display pixels of the third row, and a first color dot (31R, 32R, 33R ... ) of the pixels of the third row of said third viewpoint is displayed on the color dots of rank 5+2N modulo 3N of the display pixels of the third row, etc. ... ;

and a second color dot of the pixels of the third row of the $N^{th}$ viewpoint is displayed on the color dots 2 modulo 3N of the display pixels of the third row, a third (for $R_0(N/3)=1$) or a first (for $R_0(N/3)=2$) color dot of the pixels of the third row of the $N^{th}$ viewpoint is displayed on the color dots of rank N+2 modulo 3N of the display pixels of the third row, and a first (for $R_0(N/3)=1$) or a third (for $R_0(N/3)=2$) color dot of the pixels of the third row of the $N^{th}$ viewpoint is displayed on the color dot of rank 2N+2 modulo 3N of the display pixels of the third row;

and so on by circular permutation up to the $N^{th}$ row.

According to third and fourth variants, the method is characterized in that N is a multiple of 3 and in that only one color dot of each pixel of the autostereoscopic image to be displayed is used and in that a first row of the screen successively displays the first color dot (11R) of the first pixel of the first row of the first viewpoint of the autostereoscopic image, the second color dot (21G) of the first pixel of the first row of the second viewpoint of the autostereoscopic image, and so on up to the third color dot (N1B) of the first pixel of the first row of the $N^{th}$ viewpoint of the autostereoscopic image, the sequence subsequently being repeated for the second pixel of each viewpoint of the first row of the autostereoscopic image and the following ones.

According to the third variant, the method is characterized in that the second row of the screen successively displays the second color dot (11G) of the first pixel of the second row of the first viewpoint of the autostereoscopic image, the third color dot (21B) of the first pixel of the second row of the second viewpoint of the autostereoscopic image, and so on up to the first color dot (N1R) of the first pixel of the second row of the $N^{th}$ viewpoint of the autostereoscopic image, the sequence subsequently being repeated for the second pixel of each viewpoint of the second row of the autostereoscopic image and the following ones, and in that the third row of the screen successively displays the third color dot (11B) of the first pixel of the third row of the first viewpoint of the autostereoscopic image, the first color dot (21R) of the first pixel of the second row of the second viewpoint of the autostereoscopic image, and so on up to the second color dot (N1G) of the first pixel of the second row of the $N^{th}$ viewpoint of the autostereoscopic image, the sequence subsequently being repeated for the second pixel of each viewpoint of the third row of the autostereoscopic image and the following ones, and also being repeated for the groups of three rows of the screen that follow the group formed by said first, second and third rows of the screen.

It may be characterized in that the screen has at least one group of three rows whose pixels have three color dots disposed over three successive columns of color dots, the color dots being permutated from one row to another, the first row comprising display pixels each of which is successively composed of a first color dot, of a second color dot and of a third color dot, the second row comprising display pixels each of which is successively composed of a second color dot, of a third color dot and of a first color dot, and the third row comprising display pixels each of which is successively composed of a third color dot, of a first color dot and of a second color dot.

It may be characterized in that it implements, for viewing the autostereoscopic image on a screen, an angular selection array, such as a lenticular array or a parallax array, having one axis parallel to said columns of color dots.

According to the fourth variant, the method is characterized in that the second row of the screen successively displays, starting from the second position, the second color dot (11G) of the first pixel of the second row of the first viewpoint of the autostereoscopic image, the third color dot (21B) of the first pixel of the second row of the second viewpoint of the autostereoscopic image, and so on up to the first color dot (N1R) of the first pixel of the second row of the $N^{th}$ viewpoint of the autostereoscopic image, the sequence subsequently being repeated for the second pixel of each viewpoint of the second row of the autostereoscopic image then the following ones, and in that the third row of the screen successively displays in the third position the third color dot (11B) of the first pixel of the third row of the first viewpoint of the autostereoscopic image, the first color dot (21R) of the first pixel of the third row of the second viewpoint of the autostereoscopic image, and so on up to the second color dot (N1G) of the first pixel of the third row of the $N^{th}$ viewpoint of the autostereoscopic image, the sequence subsequently being repeated for the second pixel of each viewpoint of the third row of the autostereoscopic image, then the following ones.

It may be characterized in that, for displaying said autostereoscopic images, it implements a screen equipped with an angular selection array (lenticular array or parallax array) whose axes are parallel to a diagonal of the color dots and whose pitch PR allows N color dots to be covered.

BRIEF DESCRIPTION OF THE DRAWINGS

Other features and advantages of the invention will become more clearly apparent upon reading the description hereinafter, in conjunction with the drawings in which:

FIGS. 1 and 2 illustrate the first variant for which the color dots are permutated according to the invention for successive rows of a part of the screen having different rows of pixels, with displacement by one rank of the color dots from one row to the other, FIG. 1 corresponding to the case of N=4 viewpoints whereas FIG. 2 corresponds to the case of N=8 viewpoints;

FIGS. 3 to 6 illustrate, for 4, 5, 7 and 8 viewpoints respectively, the second variant for which the color dots are permutated according to the invention for successive rows of a part of a screen having similar rows of pixels for viewing through a lenticular array or a parallax array;

FIGS. 7*a* and 7*d* illustrate how the 4 viewpoints are viewed in the case of FIG. 3;

Figures 8G, 8H:
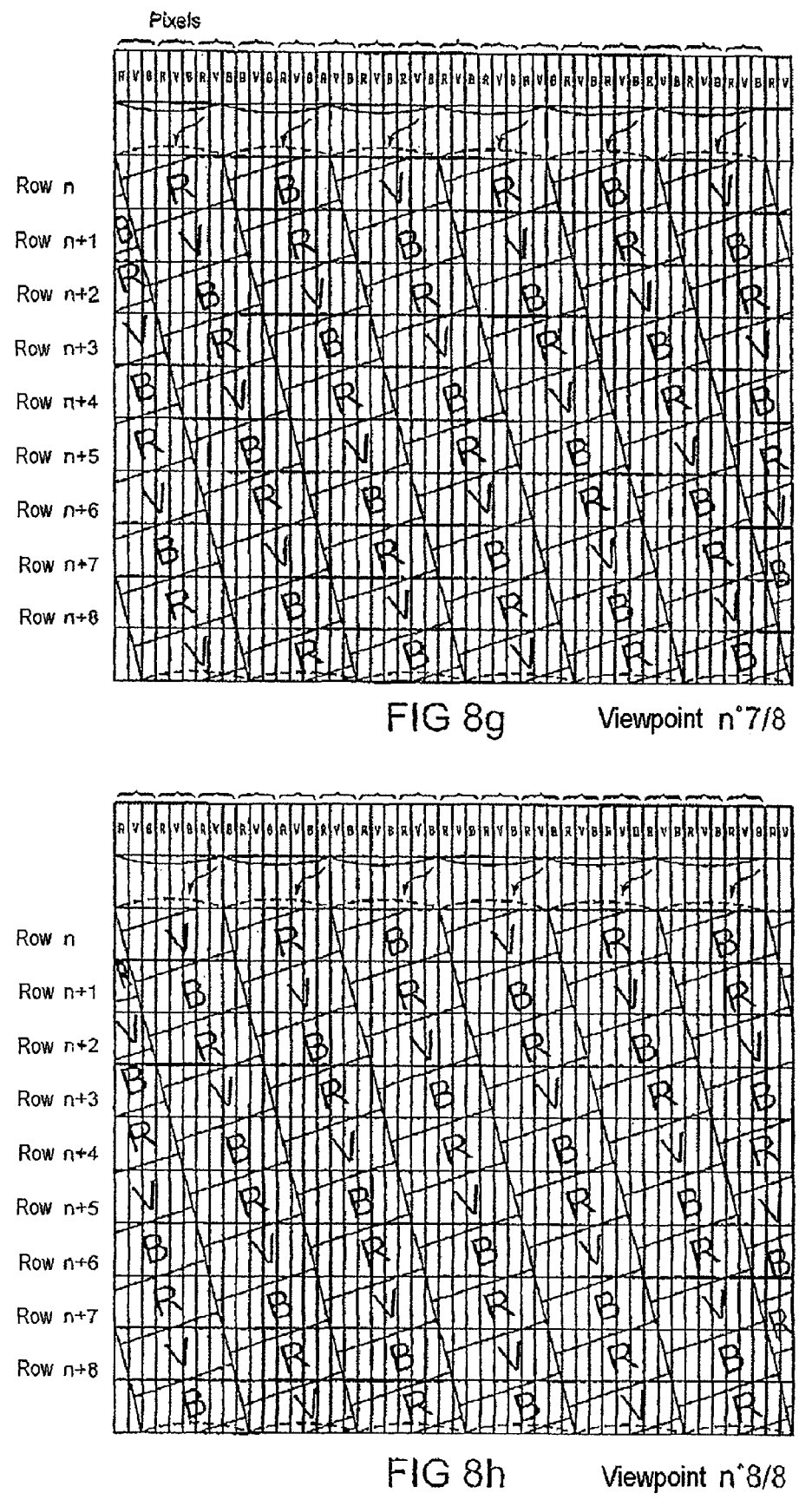

FIGS. 8*a* to 8*h* illustrate how the 8 viewpoints are viewed in the case of FIG. 6;

FIG. 9 illustrates the first variant in the case N=2;

FIGS. 10*a* to 10*c* illustrate the second variant in the case where N=2, FIGS. 10*b* and 10*c* showing the display of the first and of the second viewpoint, respectively, through the array disposed at an oblique angle;

FIGS. 11 and 12 illustrate the third variant in the respective cases of N=3 viewpoints and of N=9 viewpoints; and FIG. 13 illustrates the fourth variant in the case of N=3 viewpoints.

DETAILED DESCRIPTION

Figure 10B:
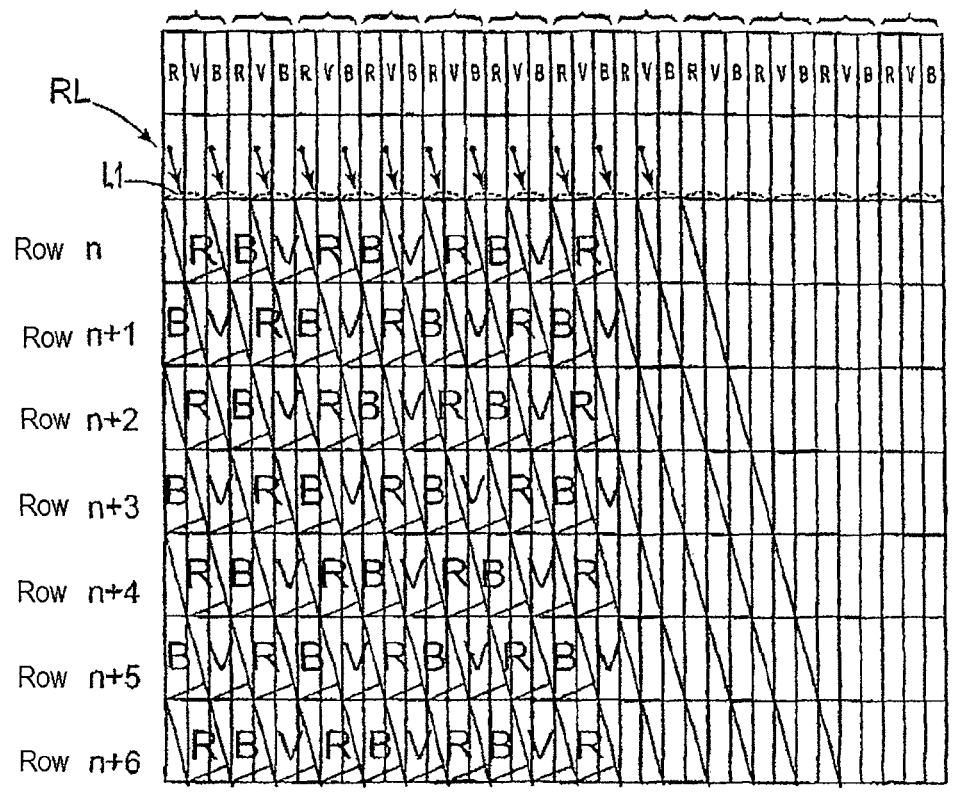

In the drawings, the color dots of the autostereoscopic image are identified by a composite index using two digits and one letter. The first digit is the number of the viewpoint (in the range from 1 to N). The second digit is the number or rank of the pixel. The letter R, G or B denotes the color (red, green or blue) corresponding to the color dot. The function $R_0(N/3)$ denotes the remainder in the division of N by 3.

Example

11R signifies: viewpoint n° 1, pixel n° 1, color red. The pixel n° 1 of the viewpoint n° 1 thus comprises the color dots 11R, 11G and 11B.

32B signifies: viewpoint n° 3, pixel n° 2, color blue. The pixel n° 2 of the viewpoint n° 3 thus comprises the color dots 32R, 32G and 32B.

Figures 1, 2:
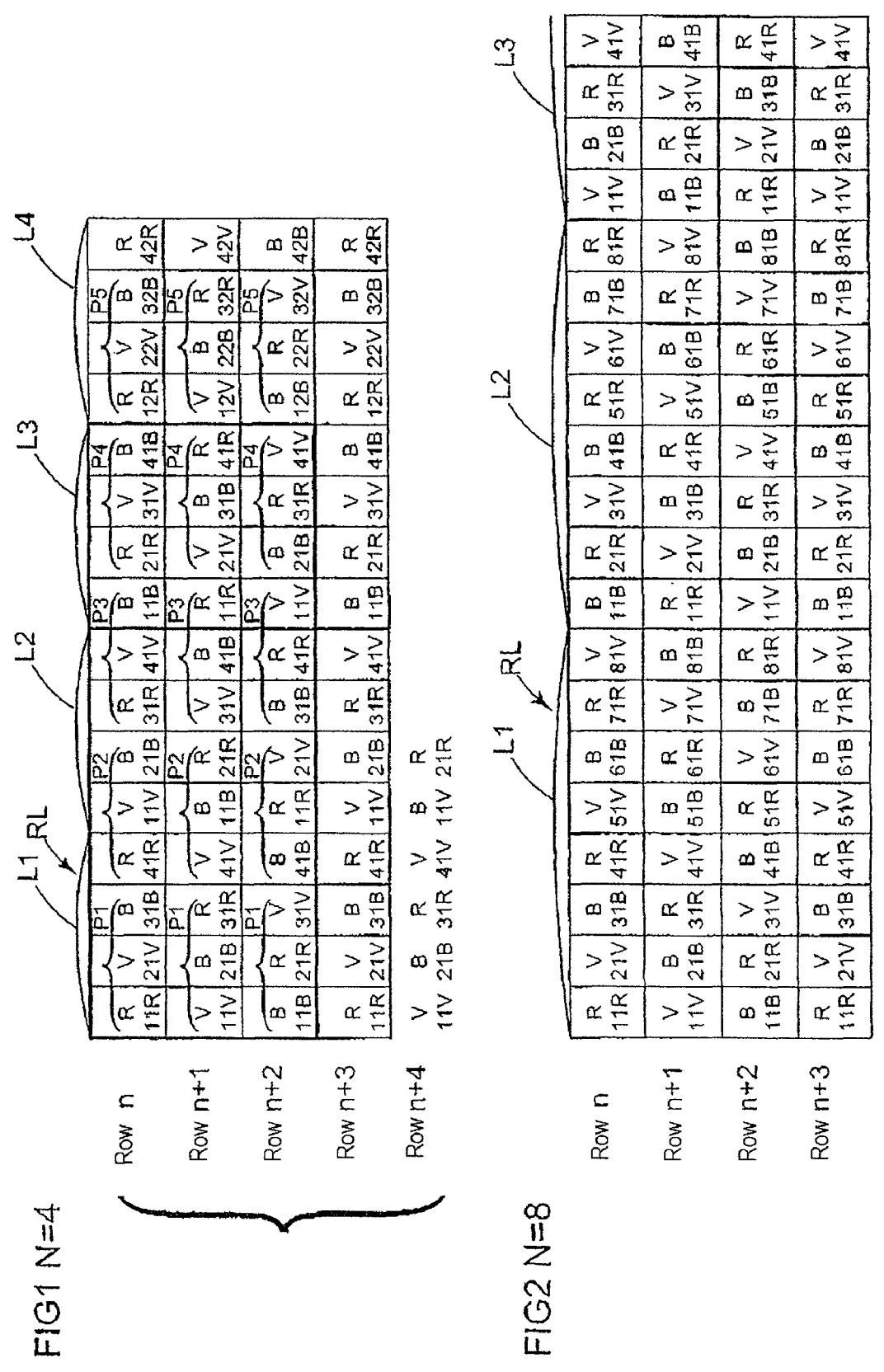

As shown in FIG. 1, for N=4 viewpoints, a lenticular array or the parallax viewing array RL has elements, for example lenticules or slits $L_1, L_2, \ldots$ whose pitch is equal to that of four color dots. The screen has display pixels P1, P2, . . . composed of color dot triplets red R, green G and blue B in succession for the row n, G, B and R in succession for the row n+1, B, R and G in succession for the row n+2, and again R, G and B in succession for the row n+3.

There is therefore, from one row to another, a displacement of one step equal to the pitch of the color dots in the direction of the rows of the screen for three successive rows.

The color dots of each of the p pixels of the autostereoscopic image are displayed with a pitch equal to N=4 times the pitch of the color dots in the direction of the rows of the screen. For displaying over the whole length of the rows, p=q'/N, since the q' display pixels share the p pixels of the N viewpoints between them. For displaying over a part of the rows, p<q'/N.

The rows (n+3), (n+4) and (n+5) are identical to the rows n, (n+1) and (n+2), respectively, and so on for the successive groups of 3 rows.

For example, the triplet 11R, 11G, 11B is displayed in the order 11R, 11G, 11B at the row n with a pitch equal to 4, in the order 11G, 11B and 11R at the row n+1, and in the order 11B, 11R and 11G at the row n+2, and again in the order 11R, 11G, 11B at the row n+3, as a consequence of the permutation of the color dots from one row to another of the screen.

For example, the triplet 31R, 31G, 31B is displayed in the order 31B, 31R, 31G at the row n, in the order 31R, 31G and 31B at the row n+1, and in the order 31G, 31B, 31R at the row n+2 and again in the order 31R, 31G, 31B at the row n+3 and so on.

Thus, the color dots of the pixels of the viewpoints of the autostereoscopic image are seen in 3 successive lenses or slits of the array RL, the order of the color dots changing from one row to another, and returning to the same order every three rows.

FIG. 2 shows the permutation in the case where N=8 (autostereoscopic image with 8 viewpoints). In this case, the array RL has a pitch equal to N=8 times the pitch of the color dots along the rows.

Figures 3, 4:
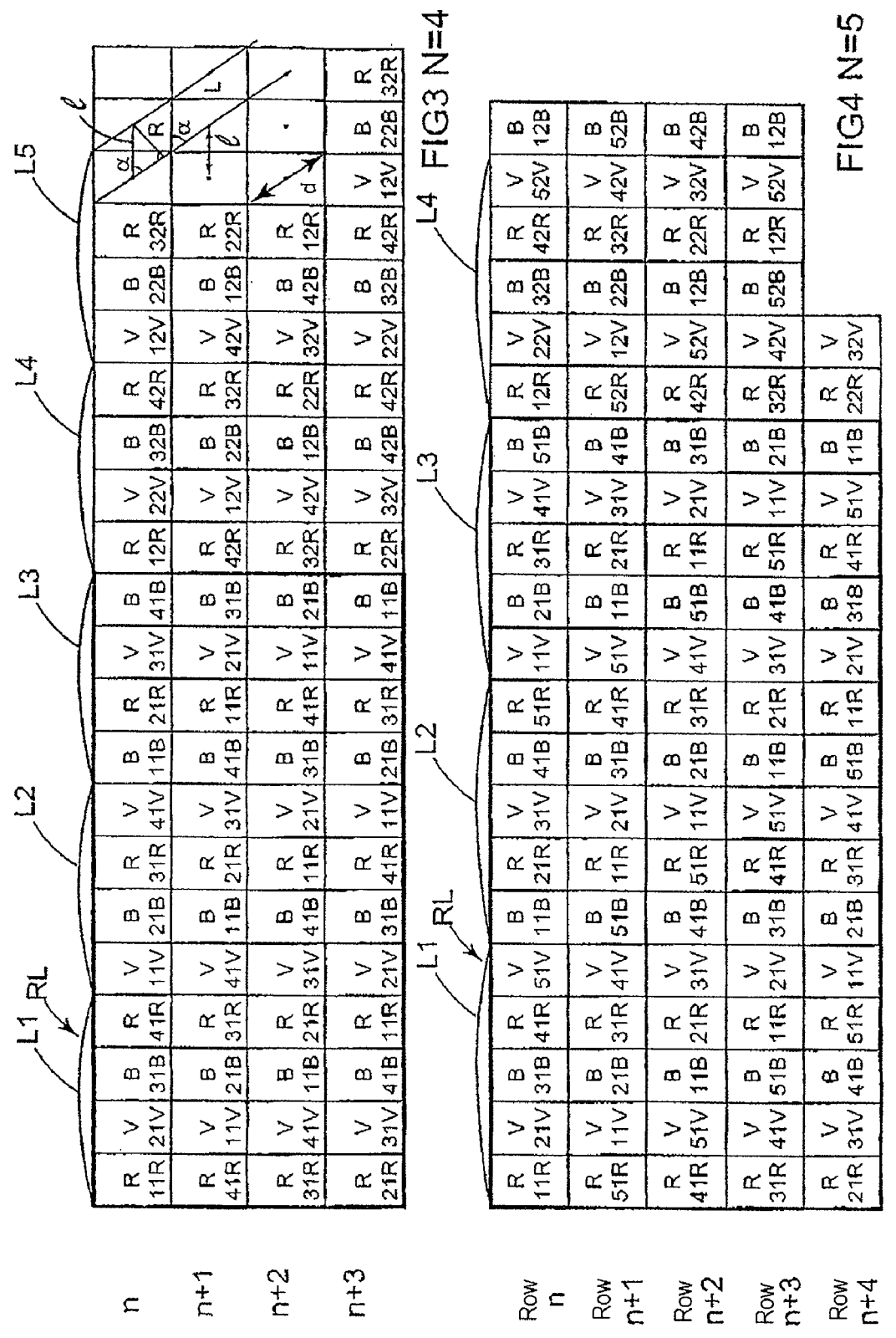

FIG. 3 and the following ones correspond to the case of a conventional screen whose rows of display pixels are identical. According to the invention, a displacement of the display is introduced over N successive rows (and no longer three successive rows as previously), this sequence subsequently being vertically repeated for the groups of N successive rows. In other words, the rows n+N, (n+N+1) . . . (n+2N−1) are identical to the lines n, n+1, . . . (n+N−1), respectively, and so on. The array RL (lenticular array or parallax array) is inclined in such a manner that one of its selector elements (cylindrical lenticule or slit) is parallel to the rows connecting the centers of the color dots, taking into account a displacement from one row to another which is equal to the pitch of a color dot. The pitch of the lenticular array or of the parallax array is modified by this inclination according to the formula hereinbelow in conjunction with FIG. 3. The value of the angle of inclination is independent of the number of viewpoints.

If PR is the pitch of the array, I the pitch of the color dots along the rows, L the pitch of the rows, d the length of the diagonal of one color dot, α the angle of inclination of the axis of the array with respect to the direction of the rows of the screen, and β the angle of inclination of the axis of the array with respect to the direction of the columns of the screen, then:

$$\sin\alpha = \frac{PR}{Nl} = \frac{L}{d}$$

and $$d^2 = L^2 + \frac{l^2}{4}$$

from which $$PR = \frac{NlL}{\sqrt{L^2 + \frac{l^2}{4}}}$$

$$\sin\alpha = \frac{NlL}{\sqrt{L^2 + \frac{l^2}{4}}} = \cos\beta$$

Figure 5:
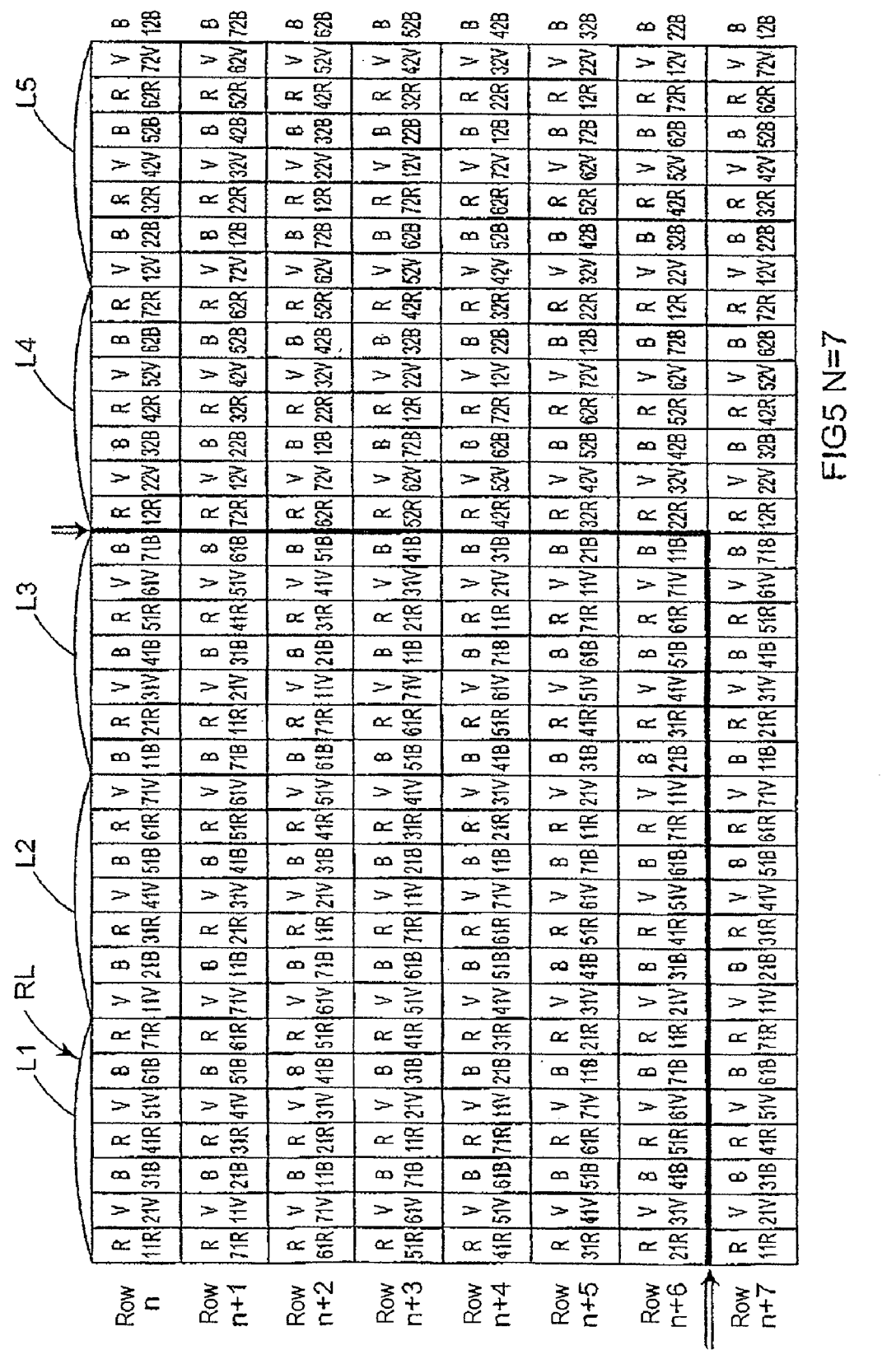
Figure 6:
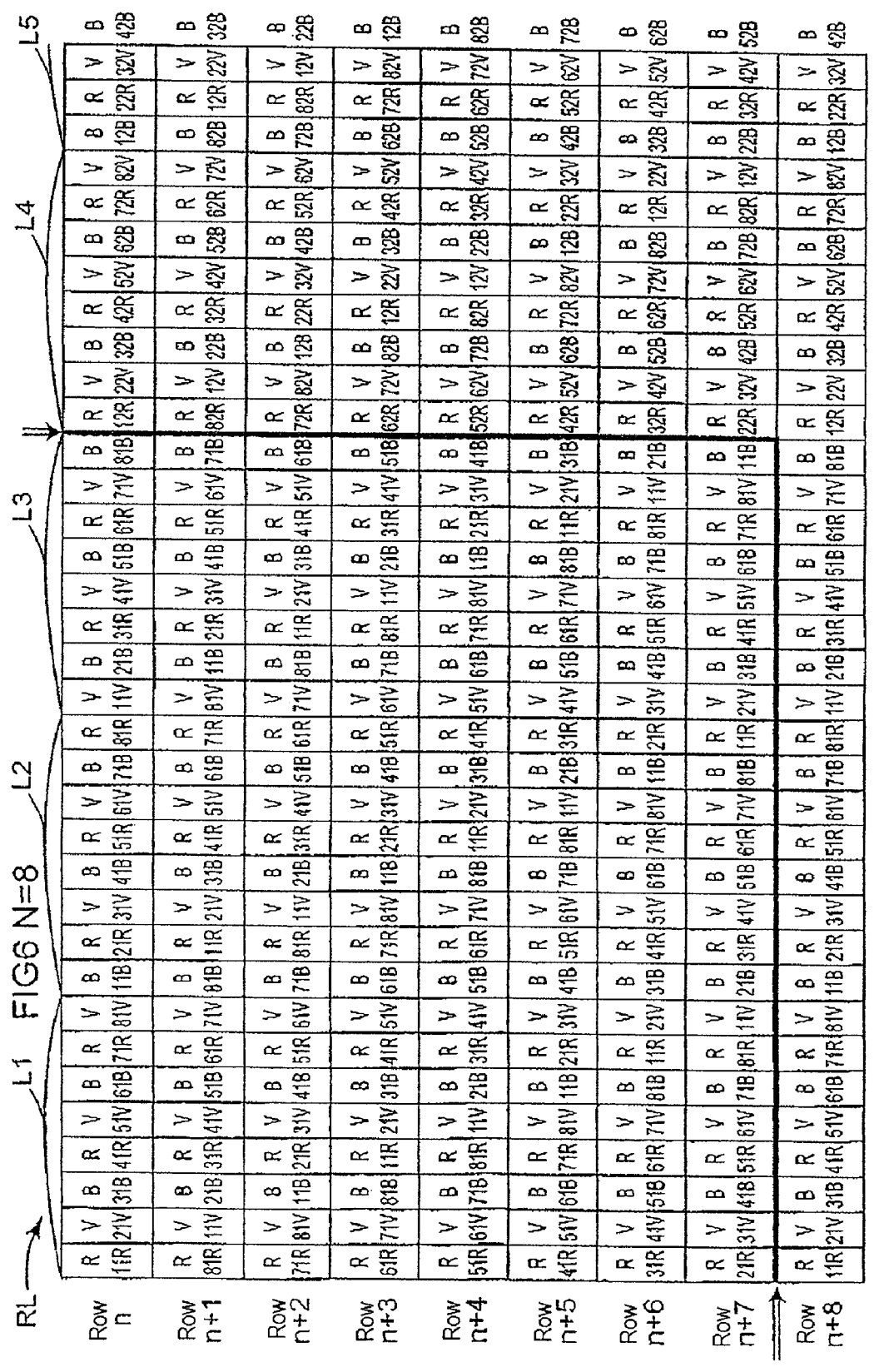

FIG. 4 relates to the cases where N=5, whereas FIGS. 5 and 6 are relative to the cases where N=7 and N=8, respectively.

FIGS. 7a to 7d demonstrate the case of FIG. 3 for each of the four viewpoints. In the nominal position of observation, an autostereoscopic vision could be obtained, for example, by viewing the display from viewpoint n° 1 for the left eye and from viewpoint n° 3 for the right eye, or alternatively by viewing the display from viewpoint n° 2 for the left eye and from viewpoint n° 3 for the right eye, or by viewing the display from viewpoint n° 3 for the left eye and from viewpoint n° 4 for the right eye.

Owing to the inclination of the lenticules by an angle β with respect to the direction of the columns of the display screen, in order to produce a displacement in the direction of the rows that is equal to the pitch I of the color dots, a lenticule that magnifies for one row the red color dot R, magnifies for the next row the adjacent green color dot G and, for the following row, the blue color dot B, returning to the red color dot R on the next row, and so on. The same is true for the selection by occultation produced by a parallax array placed in front of the screen, or between the latter and an illuminating device in the case of a liquid crystal display screen.

The pixels of same number of the N autostereoscopic viewpoints are viewed via 3 successive lenses of a lenticular array (or three cylindrical slits of a parallax array), the three color dots of each pixel occupying homologous positions in front of 3 successive slits or lenses.

The effect of the permutation according to the first and second variants of the invention is that, both along the rows and down the columns, the adjacent color dots of one viewpoint that the eye of a viewer sees have a different color, which has the effect of eliminating the vertical color-banding effect and, in the case of the inclination of the array, of minimizing the inter-pixel black bars.

FIGS. 8a to 8h show the case of FIG. 6 for each of the eight viewpoints.

For each group of N rows, there thus exists, from one row to another, a displacement by one step equal to the pitch of the color dots. This displacement is effected with circular permutation in such a manner that the first color dot of the $N^{th}$ pixel appears at the start of the second row of said group, the first color dot of the $(N-1)^{th}$ pixel appears at the start of the third row of the group and so on.

As is shown in FIGS. 3 to 8, the method according to this second embodiment is characterized, for a group of N rows comprising first, second, and third rows, . . . and an $N^{th}$ row, in that:

for the first row of said group:
  a first color dot (11R, 12R, 13R, . . . ) of the pixels of the first row of a said first viewpoint is displayed on the color dots of rank 1 modulo 3N of the display pixels of the first row, a second color dot (11G, 12G, 13G . . . ) of the pixels of the first row of a said first viewpoint is displayed on the color dots of rank 1+N modulo 3N of the display pixels of the first row, and a third color dot (11B, 12B, 13B . . . ) of the pixels of the first row of said first viewpoint is displayed on the color dots of rank 1+2N modulo 3N of the display pixels of the first row;
  a second color dot (21G, 22G, 23G . . . ) of the pixels of the first row of a said second viewpoint is displayed on the color dots of rank 2 modulo 3N of the display pixels of the first row, a third color dot (21B, 22B, 23B . . . ) of the pixels of the first row of said second viewpoint is displayed on the color dots of rank 2+N modulo 3N of the display pixels of the first row, and a first color dot (21R, 22R, 23R . . . ) of the pixels of the first row of said second viewpoint is displayed on the color dots of rank 2+2N modulo 3N of the display pixels of the first row;
  a third color dot (31B, 32B, 33B . . . ) of the pixels of the first row of a said third viewpoint is displayed on the color dots of rank 3 modulo 3N of the display pixels of the first row, a first color dot (31R, 32R, 33R . . . ) of the pixels of the first row of said third viewpoint is displayed on the color dots of rank 3+N modulo 3N of the display pixels of the first row, and a second color dot (31G, 32G, 33G . . . ) of the pixels of the first row of said third viewpoint is displayed on the color dots of rank 3+2N modulo 3N of the display pixels of the first row, etc. . . . ;
  and an $R_0(N/3)^{th}$ color dot of the pixels of the first row of the $N^{th}$ viewpoint is displayed on the color dots of rank N modulo 3N of the display pixels of the first row, an $[R_0(N/3)+1]^{th}$ color dot of the pixels of the first row of the $N^{th}$ viewpoint is displayed on the color dots of rank 2N modulo 3N of the display pixels of the first row, and the third color dot for R(N/3)=1 or the first color dot for $R_0(N/3)=2$ of the pixels of the first row of the $N^{th}$ viewpoint is displayed on the color dot of rank 3N modulo 3N of the display pixels of the first row;

for the second row of said group:

a second color dot of the pixels of the second row (11R, 12R, 13R . . . of a said first viewpoint is displayed on the color dots of rank 2 modulo 3N of the display pixels of the second row, a third color dot (11B, 12B, 13B . . . ) of the pixels of the second row of said first viewpoint is displayed on the color dots of rank 2+N modulo 3N of the display pixels of the second row, and a first color dot (11R, 12R, 13R . . . ) of the pixels of the second row of said first viewpoint is displayed on the color dots of rank 2+2N modulo 3N of the display pixels of the second row;

a third color dot (21B, 22B, 23B . . . ) of the pixels of the second row of a said second viewpoint is displayed on the color dots of rank 3 modulo 3N of the display pixels of the second row, a first color dot (21R, 22R, 23R . . . ) of the pixels of the second row of said second viewpoint is displayed on the color dots of rank 3+N modulo 3N of the display pixels of the second row, and a second color dot (21G, 22G, 23G . . . ) of the pixels of the second row of said second viewpoint is displayed on the color dots of rank 3+2N modulo 3N of the display pixels of the second row;

a first color dot (31R, 32R, 33R, . . . ) of the pixels of the second row of a said third viewpoint is displayed on the color dots of rank 4 modulo 3N of the display pixels of the second row, a second color dot (31G, 32G, 33G . . . ) of the pixels of the second row of said third viewpoint is displayed on the color dots of rank 4+N modulo 3N of the display pixels of the second row, and a third color dot (31B, 32B, 33B . . . ) of the pixels of the second row of said third viewpoint is displayed on the color dots of rank 4+2N modulo 3N of the display pixels of the second row, etc. . . . ;

and a first color dot of the pixels of the second row of the $N^{th}$ viewpoint is displayed on the color dots 1 modulo 3N of the display pixels of the second row, the second (for $R_0(N/3)=1$) or the third (for $R_0(N/3)=2$) color dot of the pixels of the second row of the $N^{th}$ viewpoint is displayed on the color dots of rank N+1 modulo 3N of the display pixels of the second row, and the third (for $R_0(N/3)=1$) or the second (for $R_0(N/3)=2$) color dot of the pixels of the second row of the $N^{th}$ viewpoint is displayed on the color dot of rank 2N+1 modulo 3N of the display pixels of the second row;

for the third row of said group:

a third color dot (11B, 12B, 13B . . . ) of the pixels of the third row of a said first viewpoint is displayed on the color dots of rank 3 modulo 3N of the display pixels of the third row, a first color dot (11R, 12R, 13R . . . ) of the pixels of the third row of a said first viewpoint is displayed on the color dots of rank 3+N modulo 3N of the display pixels of the third row, and a second color dot (11G, 12G, 13G . . . ) of the pixels of the third row of said first viewpoint is displayed on the color dots of rank 1+2N modulo 3N of the display pixels of the third row;

a first color dot (21R, 22R, 23R . . . ) of the pixels of the third row of a said second viewpoint is displayed on the color dots of rank 4 modulo 3N of the display pixels of the third row, a second color dot of the pixels of the third row of said second viewpoint is displayed on the color dots of rank 4+N modulo 3N of the display pixels of the third row, and a first color dot (21R, 22R, 23R . . . ) of the pixels of the third row of said second viewpoint is displayed on the color dots of rank 4+2N modulo 3N of the display pixels of the third row;

a second color dot (31G, 32G, 33G . . . ) of the pixels of the third row of a said third viewpoint is displayed on the color dots of rank 5 modulo 3N of the display pixels of the third row, a third color dot (31B, 32B, 33B . . . ) of the pixels of the third row of said third viewpoint is displayed on the color dots of rank 5+N modulo 3N of the display pixels of the third row, and a first color dot (31R, 32R, 33R . . . ) of the pixels of the third row of said third viewpoint is displayed on the color dots of rank 5+2N modulo 3N of the display pixels of the third row, etc. . . . ;

and a second color dot of the successive pixels of the $N^{th}$ viewpoint is displayed on the color dots 2 modulo 3N of the display pixels of the third row, a third (for $R_0(N/3)=1$) or a first (for $R_0(N/3)=2$) color dot of the pixels of the third row of the $N^{th}$ viewpoint is displayed on the color dots of rank N+2 modulo 3N of the display pixels of the third row, and a first (for $R_0(N/3)=1$) or a third (for $R_0(N/3)=2$) color dot of the pixels of the third row of the $N^{th}$ viewpoint is displayed on the color dot of rank 2N+2 modulo 3N of the display pixels of the third row, and so on up to the $N^{th}$ row of the group.

Figure 10C:
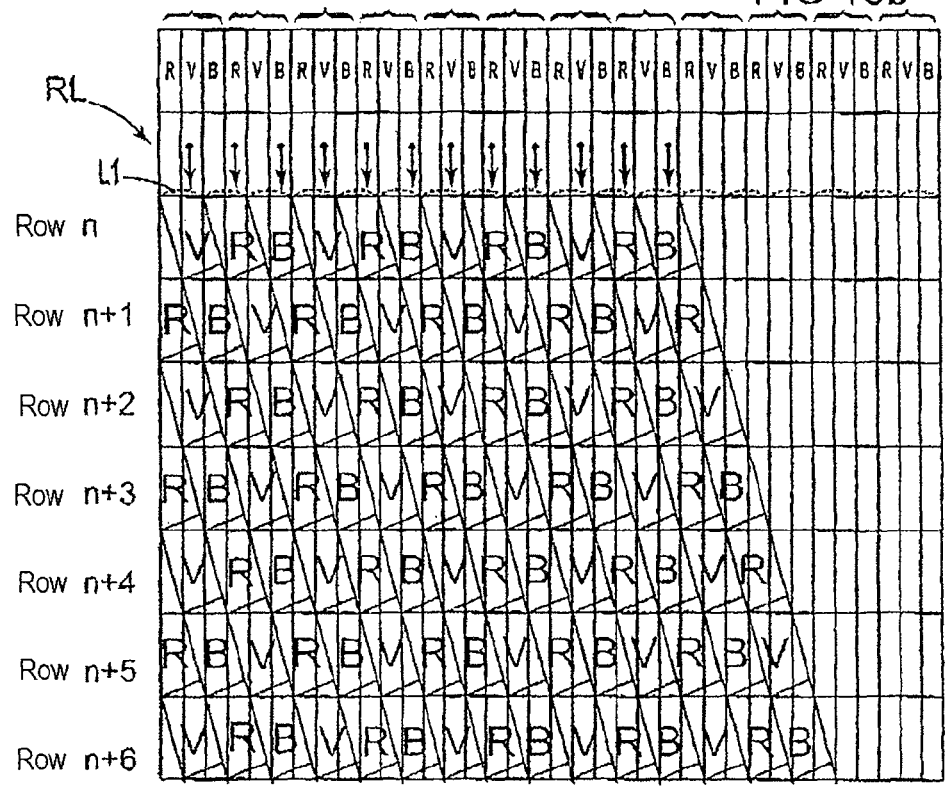

FIGS. 9 and 10 to 10c illustrate the case of N=2 for the first and second variants respectively. In the case of the first variant, there is repetition by groups of 3 rows, whereas in the case of the second variant, there is repetition by groups of N=2 rows.

Figures 11, 12:
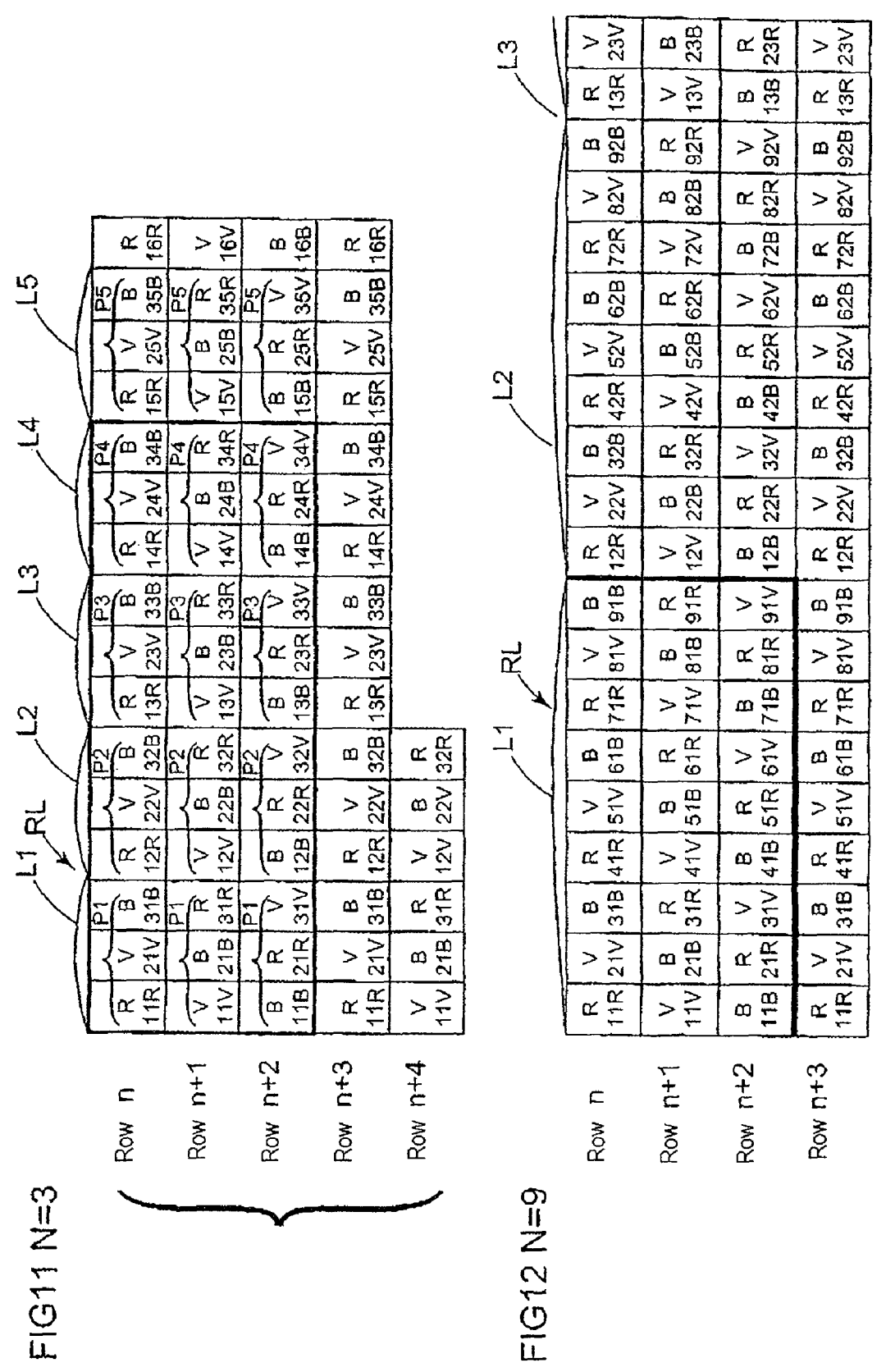
Figure 13:
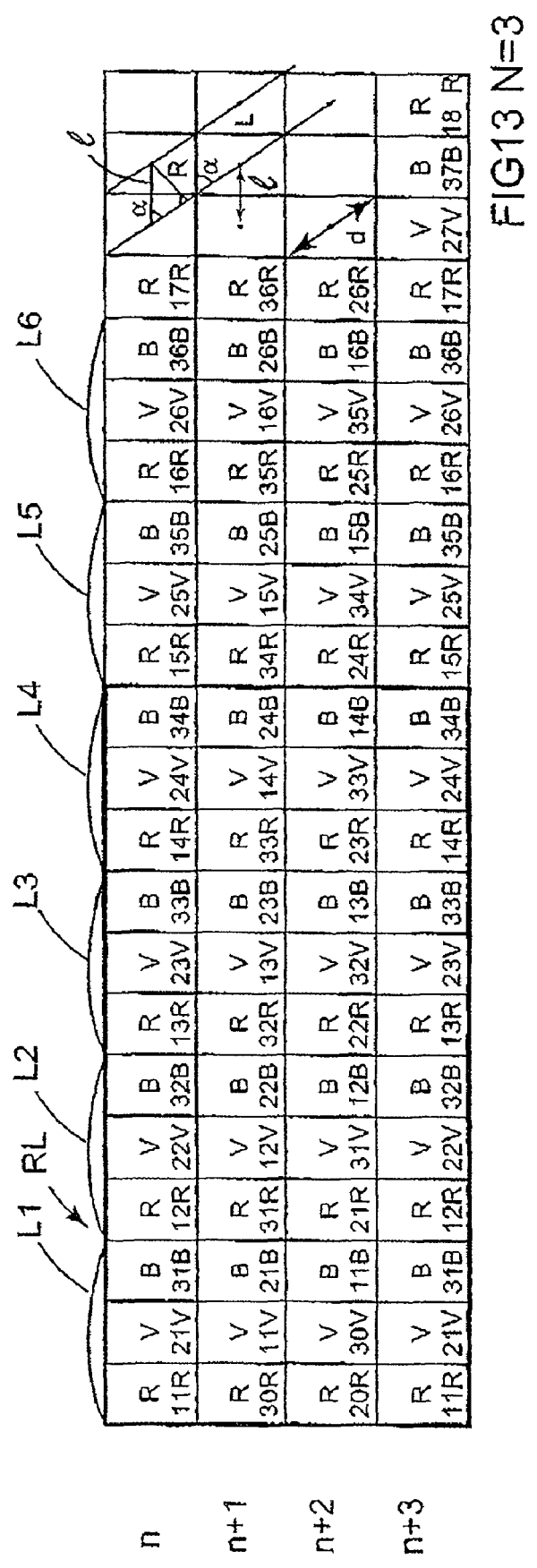

FIGS. 11 to 13 relate to the case where N is a multiple of three. The invention takes advantage of the permutation of the color dots from one row to another in order to display on each row only one color component for each viewpoint, namely, for the first row, red R for the first viewpoint (modulo 3), green G for the second viewpoint (modulo 3) and blue B for the third viewpoint (modulo 3).

In the case where the permutation of the color dots from one row to another is effected by the screen itself (FIG. 11, N=3; FIG. 12, N=9), the pixels of the autostereoscopic image are displayed in the same manner from one row to another, except that the color dot varies from one row to the next.

Since the lenticular array is placed parallel to the columns of color dots, three color dots are reconstituted from three pixels of same rank and for the same viewpoint over three successive rows. This approximation has very little detrimental effect in practice.

In order to avoid a loss of definition, the display technique described in the aforementioned application PCT WO 00/10332 is preferably used according to which only one color dot from each pixel of an autostereoscopic image of higher definition is retained.

In the case where the screen has identical rows of pixels (FIG. 13, N=3), the lenticular viewing array is inclined and the color dots are displaced by one rank when going from one row to another.

As in the case of the first and second variants, the effect of vertical color banding is eliminated and in the case where the array is inclined, the inter-pixel black bars are minimized.

In the case of FIGS. 11 and 13 (N=3), for the first row n, each display pixel comes from three pixels of same rank of three different viewpoints (for example, 13R, 23G, 33B).

For the second (n+1) and third (n+2) rows, each display pixel comes from two pixels of same rank of two different viewpoints and from one pixel of another rank of a third viewpoint (for example 23R, 33G, 14B on the row n+2 in FIGS. 11 and 13).

In the conventional case where the manufacturer has placed identical colors one above the other for all the rows, the optical selector is therefore oriented in the direction of a diagonal passing through the center of the color dots, one above the other and contiguous, of different colors.

It is in order to improve the quality and to avoid the cumulative effect of repetition of the colors of the dots vertically visible in the columns that the optical selector is placed slightly oblique so as to provide a second circular permutation of the color dots along the new axis of the optical selector. Depending on the constitution of the screens (spatial arrangement and the size of the pixels, size and shape of the blind spaces between the color dots), the angle of inclination of the optical selector is chosen to be as close to vertical as possible (the eyes of the viewer being most often horizontally aligned) while at the same time allowing groups of N color dots to be created in the following rows commencing with one of the colors of the dots of different colors from the upper row and so on modulo P color dots.

If the color dots of the pixels of the screen, even though they are aligned in the horizontal and the vertical direction, are not ordered identically in the rows that follow each other, then the optical selector can remain strictly vertical.

In order to ensure a very high separation efficiency for the optical selector placed at a focal length (or equivalent—for the parallax barriers) from the screen, it must be ensured that the optical axes of the selector are simultaneously horizontally aligned with all the color pixels modulo N, which means that the pitch of the optical selector must be redefined for a chosen ideal viewing distance. The more oblique the optical selector, the more its pitch is reduced along the direction perpendicular to its longitudinal axis. The mode of calculation has been presented hereinabove.

When the autostereoscopic image is created from N viewpoints, only the pixels are used with colors of each of the pixels of each of the viewpoints in correspondence with those of the screen, that are observable through the optical selector in the directions chosen for viewing each of the viewpoints. When moving in a direction parallel to the plane of the screen at a distance different from the ideal viewing distance, the change of viewpoints is seen in the direction of the axis of the optical selector, oriented diagonally, without any distortion of the viewpoints (the images remain straight and are unaltered).

If the optical selector is an array of microlenses, their focal length is chosen so that, at the ideal viewing distance (flat color-tone distance), the horizontal distance that separates the observation of two different contiguous viewpoints is not greater than the average spacing between ocular pupils.

An angular displacement of the array could be envisioned in such a manner that it is parallel to the diagonal of a group of two color dots placed side-by-side along a row. Such an inclination is not beneficial. In fact, it only provides one permutation of a color dot from one row to another since there are three color dots. It is therefore more advantageous to place the array parallel to the other diagonal of the individual color dots.

The invention claimed is:

1. A method for displaying an autostereoscopic image having N viewpoints over at least a part of a display screen comprising display pixels arranged in rows and columns, each display pixel comprising first, second, and third color dots aligned along the same row and each of which is of different color (R, G, B), the first display pixel of a row being formed by the color dots of rank 1 to 3, the second display pixel of a row being formed by the color dots of rank 4 to 6, . . . the display pixel of rank q of a row being formed by the color dots of rank (3q−2) to 3q, in which method N is greater than 1 and in which the pixels of an autostereoscopic image to be displayed are displayed in such a manner that the 3 color dots of each display pixel display 3 color dots of homologous color component of pixels of the autostereoscopic image coming from at least two pixels of same rank from at least two different viewpoints, characterized in that, for at least one group of two successive rows of the image comprising a first, a second and a third row, said spatial distribution of the 3 color dots is displaced by at least one step corresponding to one color dot when going from one row of the group to an adjacent row.

2. The method as claimed in claim 1, characterized in that N is not a multiple of 3 and in that the pixels of an autostereoscopic image to be displayed are displayed by spatially distributing the three color dots of each pixel of the autostereoscopic image between the three color dots of homologous color component of at least two different display pixels.

3. The method as claimed in claim 2, characterized in that N=2 and in that:
   the first row of a group of three rows of the screen successively displays the first color dot (11R) of the first pixel of the first row of the first viewpoint of the autostereoscopic image, the second color dot (21G) of the first pixel of the first row of the second viewpoint of the autostereoscopic image, the third color dot (11B) of the first pixel of the first row of the first viewpoint of the autostereoscopic image, and so on up to the third color dot ($2p$B) of the $p^{th}$ pixel of the first row of the second viewpoint of the autostereoscopic image;
   the second row of a group of three rows of the screen successively displays the second color dot of the first pixel (11G) of the second row of the first viewpoint of the autostereoscopic image, the third color dot of the first pixel (21B) of the second row of the second viewpoint of the autostereoscopic image, the first color dot (11R) of the first pixel of the second row of the first viewpoint of the autostereoscopic image, and so on up to the first color dot ($2p$R) of the $p^{th}$ pixel of the second row of the second viewpoint of the autostereoscopic image;
   the third row of a group of three rows of the screen successively displays the third color dot (11B) of the first pixel of the third row of the first viewpoint of the autostereoscopic image, the first color dot (21R) of the first pixel of the third row of the second viewpoint of the autostereoscopic image, the second color dot (11G) of the first pixel of the third row of the first viewpoint of the autostereoscopic image, and so on up to the second color dot ($2p$G) of the $p^{th}$ pixel of the third row of the second viewpoint of the autostereoscopic image.

4. The method as claimed in claim 2, characterized in that N>3 and in that:
   the first row of a group of three rows of the screen successively displays the first color dot (11R) of the first pixel of the first row of the first viewpoint of the autostereoscopic image, the second color dot (21G) of the first pixel of the first row of the second viewpoint of the autostereoscopic image, the third color dot (31B) of the first pixel of the first row of the third viewpoint of the autostereoscopic image, and so on up to the $R_0(N/3)^{th}$ color dot of the first pixel of the first row of the $N^{th}$ viewpoint, this sequence subsequently being repeated for the following pixels of the first row of the autostereoscopic image, namely for the first color dot of the second pixel of the first row of the first viewpoint of the autostereoscopic image, for the second color dot of the second pixel of the first row of the second viewpoint of the autostereoscopic image, . . . for the $R_0(N/3)^{th}$ color dot of the second pixel of the first row of the $N^{th}$ viewpoint, up to the last color dot which is the $R_0(N/3)^{th}$ color dot of the $q^{th}$ pixel of the first row of the $N^{th}$ viewpoint;

the second row of a said group of three rows successively displays the second color dot (11G) of the first pixel of the second row of the first viewpoint of the autostereoscopic image, the third color dot (21B) of the first pixel of the second row of the second viewpoint of the autostereoscopic image, the first color dot (31R) of the first pixel of the second row of the third viewpoint, and so on up to the $[R_0(N/3)+1]^{th}$ color dot of the first pixel of the second row of the $N^{th}$ viewpoint, this sequence subsequently being repeated for the following pixels of each of the viewpoints of the autostereoscopic image, namely with the second color dot of the second pixel of the second row of the first viewpoint of the autostereoscopic image, for the third color dot of the second pixel of the second row of the second viewpoint of the autostereoscopic image, for the first color dot of the second pixel of the second row of the third viewpoint of the autostereoscopic image, . . . for the $[R_0(N/3)+1]^{th}$ color dot of the second pixel of the second row of the $N^{th}$ viewpoint, up to the last color dot which is the $[R_0(N/3)+1]^{th}$ color dot of the $q^{th}$ pixel of the second row of the $N^{th}$ viewpoint;

and the third row of a said group of three rows successively displays the third color dot (11B) of the first pixel of the third row of the first viewpoint, the first color dot (21R) of the first pixel of the third row of the second viewpoint, the second color dot (31G) of the first pixel of the third row of the third viewpoint and so on up to the third color dot for $(R_0(N/3)=1)$ or up to the first color dot for $(R_0(N/3)=2)$ of the first pixel of the third row of the $N^{th}$ viewpoint, this sequence subsequently being repeated for the following pixels of the third row of each of the viewpoints, namely with the third color dot of the second pixel of the third row of the first viewpoint, the first color dot of the second pixel of the third row of the second viewpoint, the second color dot of the second pixel of the third row of the third viewpoint, . . . for the third color dot for $(R_0(N/3)=1)$ or to the first color dot for $(R_0(N/3)=2)$ of the second pixel of the third row of the $N^{th}$ viewpoint, up to the last color dot which is the third color dot for $(R_0(N/3)=1)$ or the first color dot for $R_0(N/3)=2$ of the $q^{th}$ pixel of the third row of the $N^{th}$ viewpoint, $R_0(N/3)$ denoting the remainder (1 or 2) of the division of N by 3.

5. The method as claimed in claim 3, characterized in that the screen has at least one group of three rows whose pixels have three color dots disposed over three successive columns of color dots, the color dots being permutated from one row to another, the first row comprising display pixels each of which is successively composed of a first color dot, of a second color dot and of a third color dot, the second row comprising display pixels each of which is successively composed of a second color dot, of a third color dot and of a first color dot, and the third row comprising display pixels each of which is successively composed of a third color dot, of a first color dot and of a second color dot.

6. The method as claimed in claim 5, characterized in that, for viewing the autostereoscopic image, it implements an angular selection array, such as a lenticular array or a parallax array, having one axis parallel to said columns of color dots.

7. The method as claimed in claim 2, characterized in that N=2 and, for a group of 2 rows comprising first and second rows, in that:

the first row of a group of two rows of the screen successively displays the first color dot (11R) of the first pixel of the first row of the first viewpoint of the autostereoscopic image, the second color dot (21G) of the first pixel of the first row of the second viewpoint of the autostereoscopic image, the third color dot (11B) of the first pixel of the first row of the first viewpoint of the autostereoscopic image, and so on up to the third color dot $(2pB)$ of the $p^{th}$ pixel of the first row of the second viewpoint of the autostereoscopic image;

the second row of a group of two rows of the screen successively displays the first color dot of the first pixel (21R) of the second row of the second viewpoint of the autostereoscopic image, the second color dot of the first pixel (11G) of the second row of the first viewpoint of the autostereoscopic image, the third color dot (21B) of the first pixel of the second row of the second viewpoint of the autostereoscopic image, and so on up to the third color dot $(1pB)$ of the $p^{th}$ pixel of the second row of the first viewpoint of the autostereoscopic image.

8. The method as claimed in claim 2, characterized in that N>3 and, for a group of N rows comprising first, second, and third rows, . . . and an $N^{th}$ row, in that:

For the first row of said group:

a first color dot (11R, 12R, 13R, . . . ) of the pixels of the first row of a said first viewpoint is displayed on the color dots of rank 1 modulo 3N of the display pixels of the first row, a second color dot (11G, 12G, 13G . . . ) of the pixels of the first row of a said first viewpoint is displayed on the color dots of rank 1+N modulo 3N of the display pixels of the first row, and a third color dot (11B, 12B, 13B . . . ) of the pixels of the first row of said first viewpoint is displayed on the color dots of rank 1+2N modulo 3N of the display pixels of the first row;

a second color dot (21G, 22G, 23G . . . ) of the pixels of the first row of a said second viewpoint is displayed on the color dots of rank 2 modulo 3N of the display pixels of the first row, a third color dot (21B, 22B, 23B . . . ) of the pixels of the first row of said second viewpoint is displayed on the color dots of rank 2+N modulo 3N of the display pixels of the first row, and a first color dot (21R, 22R, 23R . . . ) of the pixels of the first row of said second viewpoint is displayed on the color dots of rank 2+2N modulo 3N of the display pixels of the first row;

a third color dot of the pixels (31B, 32B, 33B . . . ) of the first row of a said third viewpoint is displayed on the color dots of rank 3 modulo 3N of the display pixels of the first row, a first color dot (31R, 32R, 33R . . . ) of the pixels of the first row of said third viewpoint is displayed on the color dots of rank 3+N modulo 3N of the display pixels of the first row, and a second color dot (31G, 32G, 33G . . . ) of the pixels of the first row of said third viewpoint is displayed on the color dots of rank 3+2N modulo 3N of the display pixels of the first row, etc. . . . ;

and an $R_0(N/3)^{th}$ color dot of the pixels of the first row of the $N^{th}$ viewpoint is displayed on the color dots of rank N modulo 3N of the display pixels of the first row, an $[R_0(N/3)+1]^{th}$ color dot of the pixels of the first row of the $N^{th}$ viewpoint is displayed on the color dots of rank 2N modulo 3N of the display pixels of the first row, and the third color dot for $R_0(N/3)=1$ or the first color dot for $R_0(N/3)=2$ of the pixels of the first row of the $N^{th}$ viewpoint is displayed on the color dot of rank 3N modulo 3N of the display pixels of the first row;

for the second row of said group:

a second color dot of the pixels (11G, 12G, 13G . . . ) of the second row of a said first viewpoint is displayed on the color dots of rank 2 modulo 3N of the display pixels of the second row, a third color dot (11B, 12B, 13B . . . ) of the pixels of the second row of said first viewpoint is displayed on the color dots of rank 2+N modulo 3N of the display pixels of the second row, and a first color dot (11R, 12R, 13R . . . ) of the pixels of the second row of said first viewpoint is displayed on the color dots of rank 2+2N modulo 3N of the display pixels of the second row;

a third color dot (21B, 22B, 23B . . . ) of the pixels of the second row of a said second viewpoint is displayed on the color dots of rank 3 modulo 3N of the display pixels of the second row, a first color dot (21R, 22R, 23R . . . ) of the pixels of the second row of said second viewpoint is displayed on the color dots of rank 3+N modulo 3N of the display pixels of the second row, and a second color dot (21G, 22G, 23G . . . ) of the pixels of the second row of said second viewpoint is displayed on the color dots of rank 3+2N modulo 3N of the display pixels of the second row;

a first color dot (31R, 32R, 33R, . . . ) of the pixels of the second row of a said third viewpoint is displayed on the color dots of rank 4 modulo 3N of the display pixels of the second row, a second color dot (31G, 32G, 33G . . . ) of the pixels of the second row of said third viewpoint is displayed on the color dots of rank 4+N modulo 3N of the display pixels of the second row, and a third color dot (31B, 32B, 33B . . . ) of the pixels of the second row of said third viewpoint is displayed on the color dots of rank 4+2N modulo 3N of the display pixels of the second row, etc. . . . ;

and a first color dot of the pixels of the second row of the $N^{th}$ viewpoint is displayed on the color dots 1 modulo 3N of the display pixels of the second row, the second (for $R_0(N/3)=1$) or the third (for $R_0(N/3)=2$) color dot for the pixels of the second row of the $N^{th}$ viewpoint is displayed on the color dots of rank N+1 modulo 3N of the display pixels of the second row, and the third (for $R_0(N/3)=1$) or the second (for $R_0(N/3)=2$) color dot of the pixels of the second row of the $N^{th}$ viewpoint is displayed on the color dots of rank 2N+1 modulo 2N of the display pixels of the second row;

for the third row of said group:

a third color dot (11B, 12B, 13B . . . ) of the pixels of the third row of a said first viewpoint is displayed on the color dots of rank 3 modulo 3N of the display pixels of the third row, a first color dot (11R, 12R, 13R . . . ) of the pixels of the third row of a said first viewpoint is displayed on the color dots of rank 3+N modulo 3N of the display pixels of the third row, and a second color dot (11G, 12G, 13G . . . ) of the pixels of the third row of said first viewpoint is displayed on the color dots of rank 1+2N modulo 3N of the display pixels of the third row;

a first color dot (21R, 22R, 23R . . . ) of the pixels of the third row of a said second viewpoint is displayed on the color dots of rank 4 modulo 3N of the display pixels of the third row, a second color dot (21G, 22G, 23G . . . ) of the pixels of the third row of said second viewpoint is displayed on the color dots of rank 4+N modulo 3N of the display pixels of the third row, and a first color dot (21R, 22R, 23R . . . ) of the pixels of the third row of said second viewpoint is displayed on the color dots of rank 4+2N modulo 3N of the display pixels of the third row;

a second color dot (31G, 32G, 33G . . . ) of the pixels of the third row of a said third viewpoint is displayed on the color dots of rank 5 modulo 3N of the display pixels of the third row, a third color dot (31B, 32B, 33B . . . ) of the pixels of the third row of said third viewpoint is displayed on the color dots of rank 5+N modulo 3N of the display pixels of the third row, and a first color dot (31R, 32R, 33R . . . ) of the pixels of the third row of said third viewpoint is displayed on the color dots of rank 5+2N modulo 3N of the display pixels of the third row, etc. . . . ;

and a second color dot of the pixels of the third row of the $N^{th}$ viewpoint is displayed on the color dots 2 modulo 3N of the display pixels of the third row, a third (for $R_0(N/3)=1$) or a first (for $R_0(N/3)=2$) color dot of the pixels of the third row of the $N^{th}$ viewpoint is displayed on the color dots of rank N+2 modulo 3N of the display pixels of the third row, and a first (for $R_0(N/3)=1$) or a third (for $R_0(N/3)=2$) color dot of the pixels of the third row of the $N^{th}$ viewpoint is displayed on the color dot of rank 2N+2 modulo 3N of the display pixels of the third row, and so on by circular permutation up to the $N^{th}$ row.

9. The method as claimed in claim 7, characterized in that, for viewing said autostereoscopic images, it implements a screen equipped with an angular selection array whose main axes are parallel to a diagonal of the color dots and whose pitch PR allows N color dots to be covered.

10. The method as claimed in claim 1, characterized in that N is a multiple of 3 and in that only one color dot of each pixel of the autostereoscopic image to be displayed is used and in that a first row of the screen successively displays the first color dot (11R) of the first pixel of the first row of the first viewpoint of the autostereoscopic image, the second color dot (21G) of the first pixel of the first row of the second viewpoint of the autostereoscopic image, and so on up to the third color dot (N1B) of the first pixel of the first row of the $N^{th}$ viewpoint of the autostereoscopic image, the sequence subsequently being repeated for the second pixel of each viewpoint of the first row of the autostereoscopic image and the following ones.

11. The method as claimed in claim 10, characterized in that the second row of the screen successively displays the second color dot (11G) of the first pixel of the second row of the first viewpoint of the autostereoscopic image, the third color dot (21B) of the first pixel of the second row of the second viewpoint of the autostereoscopic image, and so on up to the first color dot (N1R) of the first pixel of the second row of the $N^{th}$ viewpoint of the autostereoscopic image, the sequence subsequently being repeated for the second pixel of each viewpoint of the second row of the autostereoscopic image and the following ones, and in that the third row of the screen successively displays the third color dot (11B) of the first pixel of the third row of the first viewpoint of the autostereoscopic image, the first color dot (21R) of the first pixel of the second row of the second viewpoint of the autostereoscopic image, and so on up to the second color dot (N1G) of the first pixel of the second row of the $N^{th}$ viewpoint of the autostereoscopic image, the sequence subsequently being repeated for the second pixel of each viewpoint of the third row of the autostereoscopic image and the following ones, and also being repeated for the groups of three rows of the screen that follow the group formed by said first, second and third rows of the screen.

12. The method as claimed in claim 11, characterized in that the screen has at least one group of three rows whose pixels have three color dots disposed over three successive columns of color dots, the color dots being permutated from one row to another, the first row comprising display pixels each of which is successively composed of a first color dot, of a second color dot and of a third color dot, the second row comprising display pixels each of which is successively composed of a second color dot, of a third color dot and of a first color dot, and the third row comprising display pixels each of which is successively composed of a third color dot, of a first color dot and of a second color dot.

13. The method as claimed in claim 12, characterized in that it implements, for viewing the autostereoscopic image on a screen, an angular selection array, such as a lenticular array or a parallax array, having one axis parallel to said columns of color dots.

14. The method as claimed in claim 10, characterized in that the second row of the screen successively displays, starting from the second position, the second color dot (11G) of the first pixel of the second row of the first viewpoint of the autostereoscopic image, the third color dot (21B) of the first pixel of the second row of the second viewpoint of the autostereoscopic image, and so on up to the first color dot (N1R) of the first pixel of the second row of the $N^{th}$ viewpoint of the autostereoscopic image, the sequence subsequently being repeated for the second pixel of each viewpoint of the second row of the autostereoscopic image then the following ones, and in that the third row of the screen successively displays in the third position the third color dot (11B) of the first pixel of the third row of the first viewpoint of the autostereoscopic image, the first color dot (21R) of the first pixel of the third row of the second viewpoint of the autostereoscopic image, and so on up to the second color dot (N1G) of the first pixel of the third row of the $N^{th}$ viewpoint of the autostereoscopic image, the sequence subsequently being repeated for the second pixel of each viewpoint of the third row of the autostereoscopic image, then the following ones.

15. The method as claimed in claim 14, characterized in that, for displaying said autostereoscopic images, it implements a screen equipped with an angular selection array whose axes are parallel to diagonal of the color dots and whose pitch PR allows N color dots to be covered.

16. The method as claimed in claim 1, characterized in that $p=q'/N$, p denoting the pixel number of one viewpoint and q' denoting the number of the display pixels of the rows of the screen.

\* \* \* \* \*